United States Patent [19]

Roberts

[11] Patent Number: 5,326,212
[45] Date of Patent: Jul. 5, 1994

[54] SECTIONAL VAN TRAILER HAVING DETACHABLE, INTERCHANGEABLE COMPARTMENTS CAPABLE OF FORMING A CONTINUOUS VAN BODY

[76] Inventor: Hardy G. Roberts, 2790 Oneida La., Provo, Utah 84604

[21] Appl. No.: 754,891

[22] Filed: Sep. 4, 1991

Related U.S. Application Data

[63] Continuation of Ser. No. 644,877, Jan. 23, 1991, abandoned, which is a continuation of Ser. No. 296,575, Jan. 12, 1989, abandoned.

[51] Int. Cl.⁵ .................................. B65G 67/02
[52] U.S. Cl. ........................ 414/347; 160/201; 414/392; 414/399; 414/498; 414/541; 414/679
[58] Field of Search ............. 414/525.1, 498, 499, 414/491, 492, 679, 345, 347, 540, 541, 544, 392, 399; 296/146; 280/656; 160/201; 220/1.5

[56] References Cited

U.S. PATENT DOCUMENTS

| | | | |
|---|---|---|---|
| 1,303,854 | 5/1919 | Clark | 414/498 |
| 1,469,542 | 10/1923 | Storms | 160/201 X |
| 2,433,158 | 12/1947 | Reid | 296/100 |
| 2,761,581 | 9/1956 | Cohee | 220/1.5 |
| 2,811,386 | 10/1957 | Shaw | 414/498 X |
| 2,831,537 | 4/1958 | Ritter | 160/201 |
| 2,974,996 | 3/1961 | Bitterman et al. | 296/24.1 |
| 3,004,682 | 10/1961 | Bertolini et al. | 220/1.5 |
| 3,073,466 | 1/1963 | Greer et al. | 414/498 |
| 3,155,419 | 11/1964 | Garson et al. | 296/181 |
| 3,163,306 | 12/1964 | Bennett et al. | 414/498 |
| 3,382,998 | 5/1968 | Turpen | 220/1.5 |
| 3,521,780 | 7/1970 | Cook | 414/632 |
| 3,558,184 | 1/1971 | Plegat | 296/146 |
| 3,567,252 | 3/1971 | Zubko | 280/656 X |
| 3,672,525 | 6/1972 | Schaedler | 414/629 |
| 3,715,046 | 2/1973 | Marklund | 414/632 |
| 3,885,691 | 5/1975 | Knapp | 280/656 X |
| 4,092,039 | 5/1978 | Lutkerhouse | 296/26 |
| 4,298,305 | 11/1981 | Neth | 414/498 |
| 4,365,921 | 12/1982 | Brouwer et al. | 414/347 |
| 4,409,903 | 10/1983 | Wilhelmssor et al. | 414/499 X |
| 4,580,805 | 4/1986 | Bertolini | 280/656 X |
| 4,690,609 | 9/1987 | Brown | 414/543 |
| 4,778,327 | 10/1988 | Tufenkian et al. | 414/541 |
| 4,790,711 | 12/1958 | Calaway | 414/540 X |
| 4,948,326 | 8/1990 | Bedard | 414/541 |

FOREIGN PATENT DOCUMENTS

| | | | |
|---|---|---|---|
| 3621366 | 1/1988 | Fed. Rep. of Germany | 414/541 |
| 2615157 | 11/1988 | France | 414/541 |
| 2110171 | 6/1983 | United Kingdom | 414/347 |

*Primary Examiner*—David A. Bucci
*Attorney, Agent, or Firm*—Thorpe, North & Western

[57] ABSTRACT

A sectional van trailer having detachable, interchangeable compartments capable of forming a continuous van body is disclosed. One or more van sections or cargo compartments are secured to a trailer frame. The van sections may be individually removed and left at a location for loading or unloading. When removed, the van sections form secure, weather-tight individual containers for the goods disposed therein. The van sections are interconnected and each van section may remain an individual compartment or may be joined with one or more adjacent van sections to form a continuous van body. A tractor mounted hoist apparatus is provided to allow a lone truck operator to move the van sections between the ground, and the trailer frame, a storage stand, or a truck frame. The described embodiments are particularly efficient for moving both household belongings and general commodities on a long-haul trip. Moreover, since the individual van sections may be removed from a trailer, stored, and resecured to a different trailer frame, it is possible to transport the loaded van sections to a hub terminal and then transfer the van sections to outgoing trailers heading for points along the way to a final destination. Use of the present invention allows much more efficient transportation of goods by truck since loads may be planned to allow a direct, rather than circuitous, route to a final destination.

35 Claims, 16 Drawing Sheets

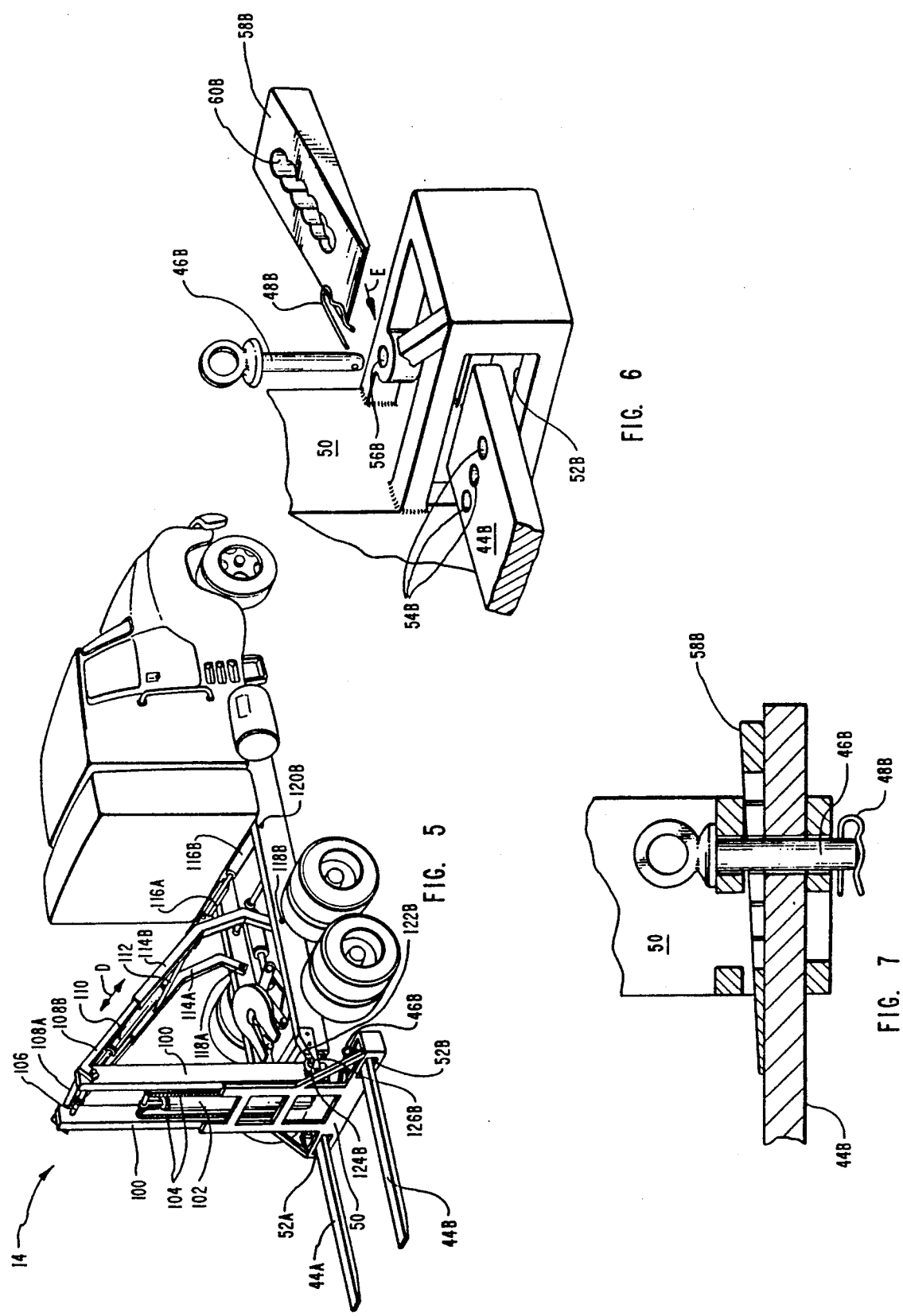

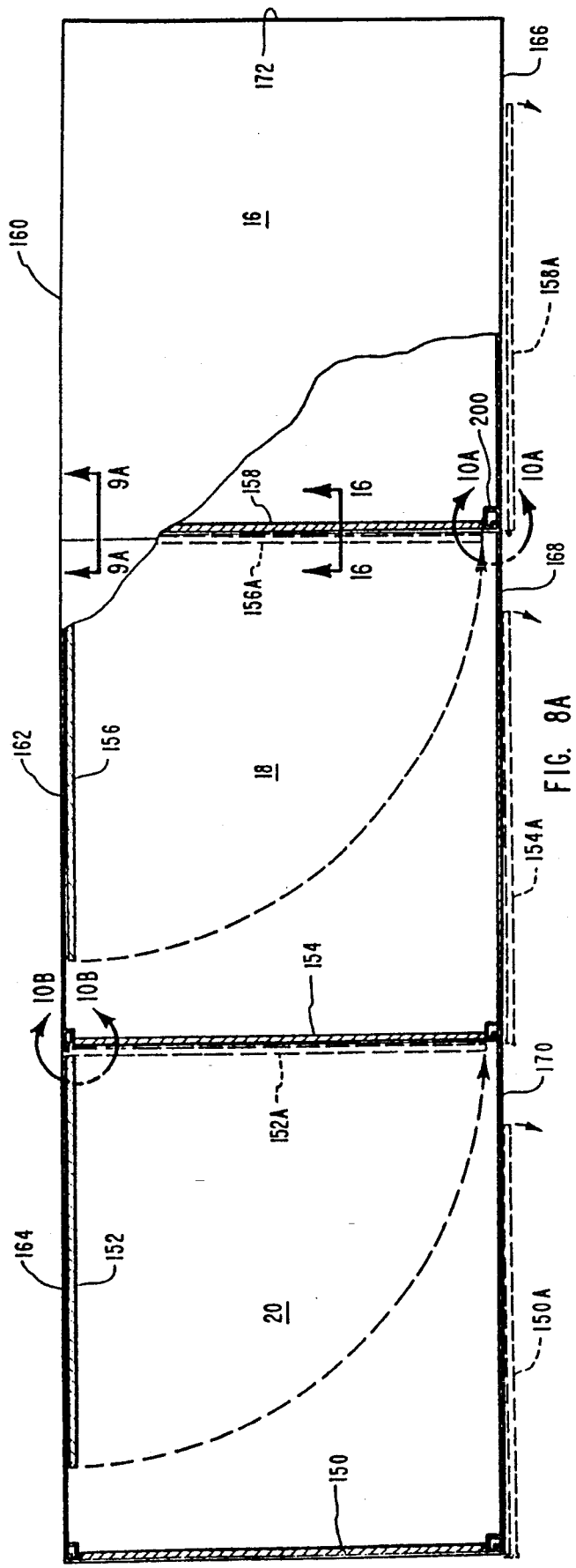

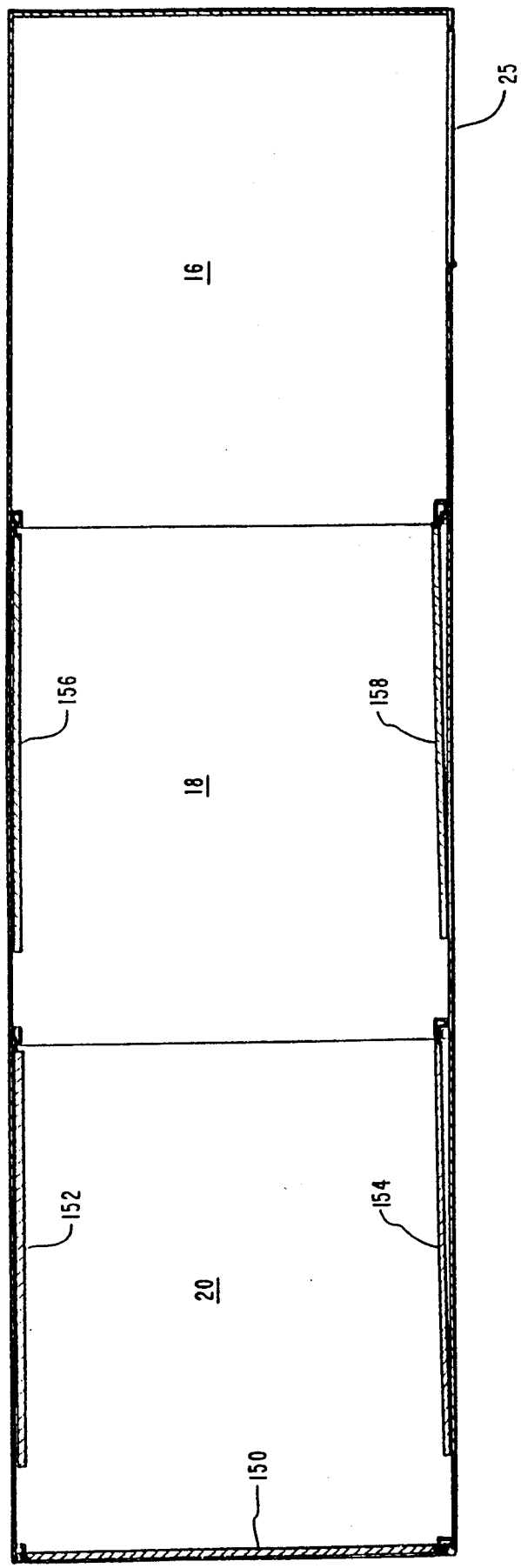

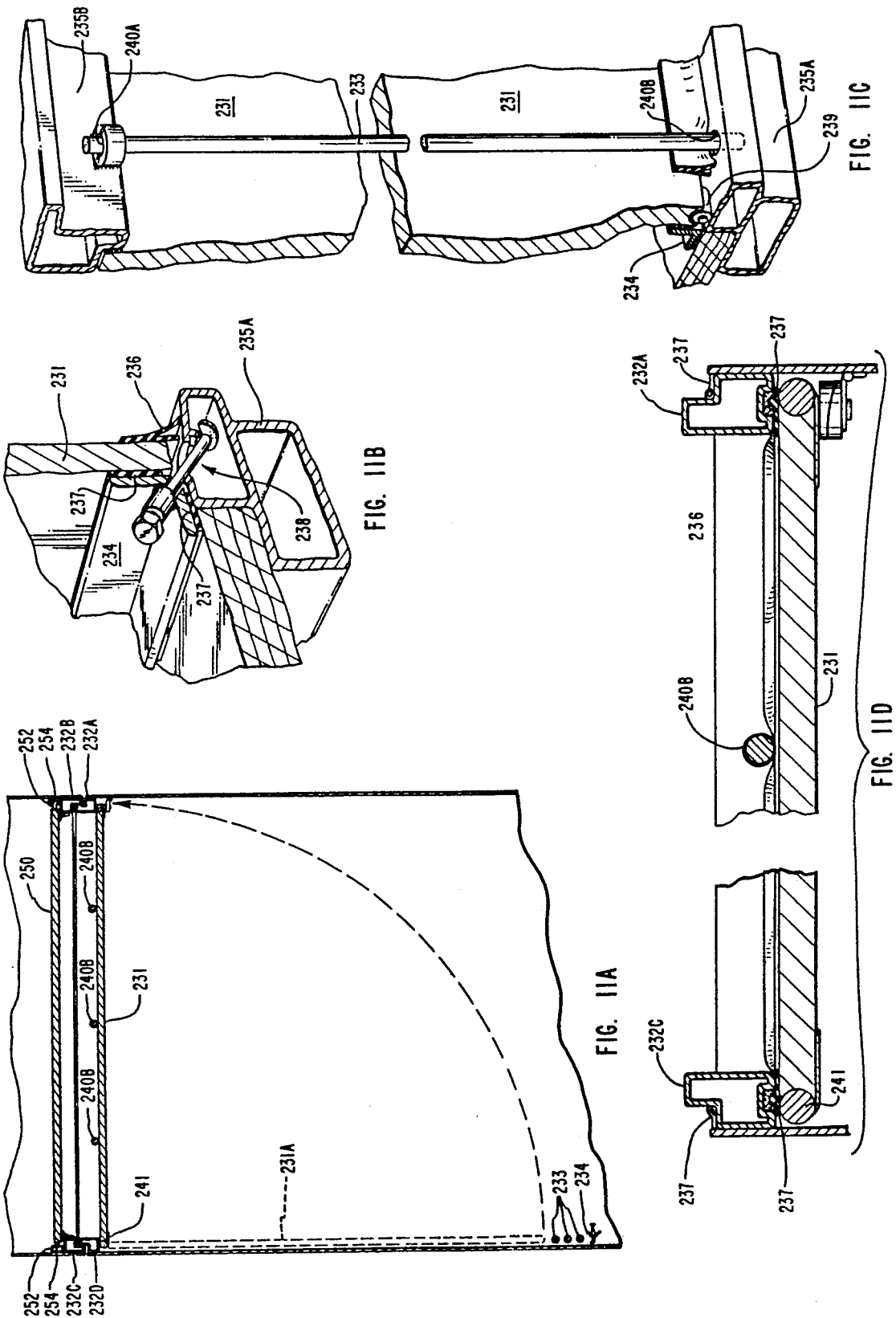

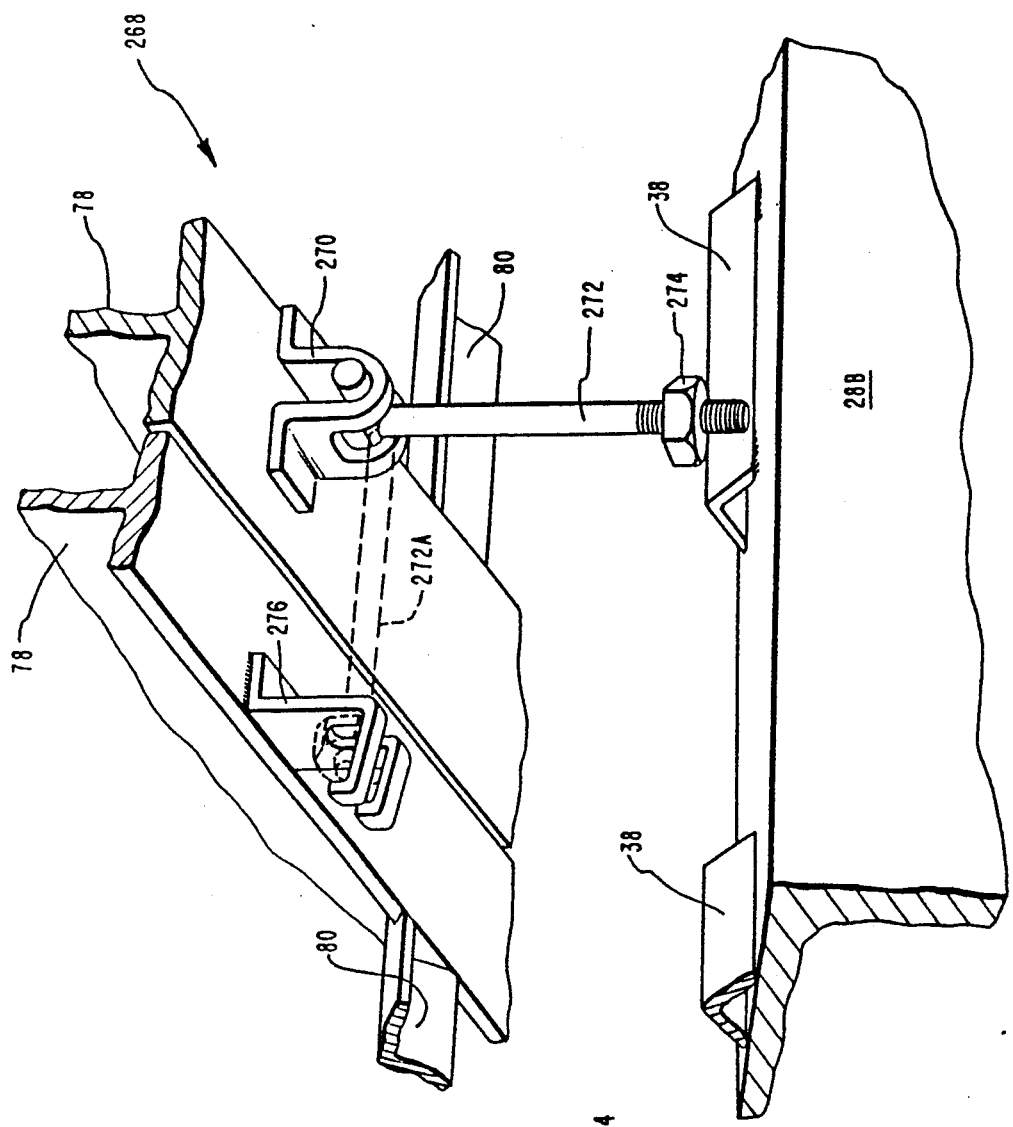
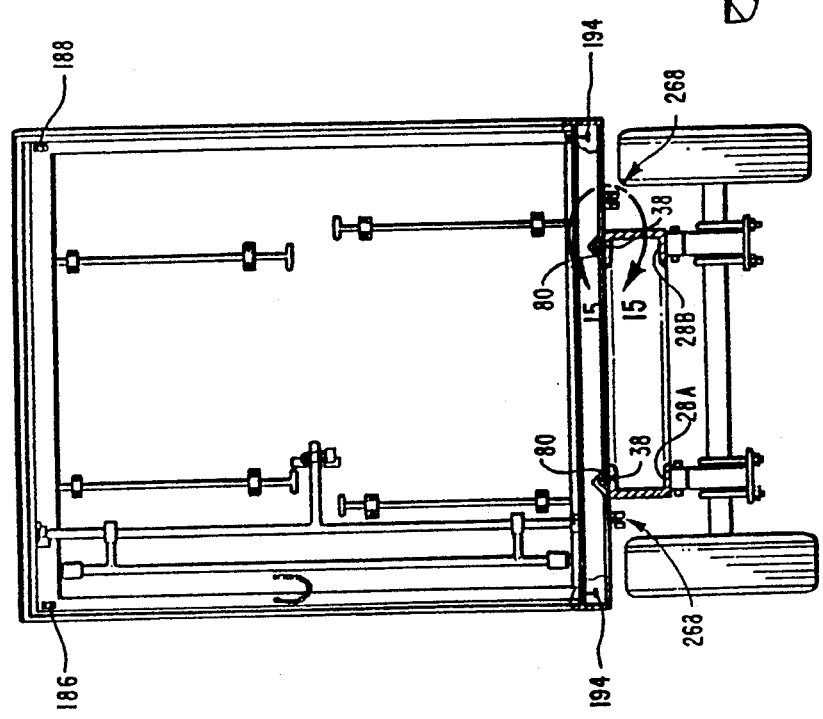
FIG. 15
FIG. 14

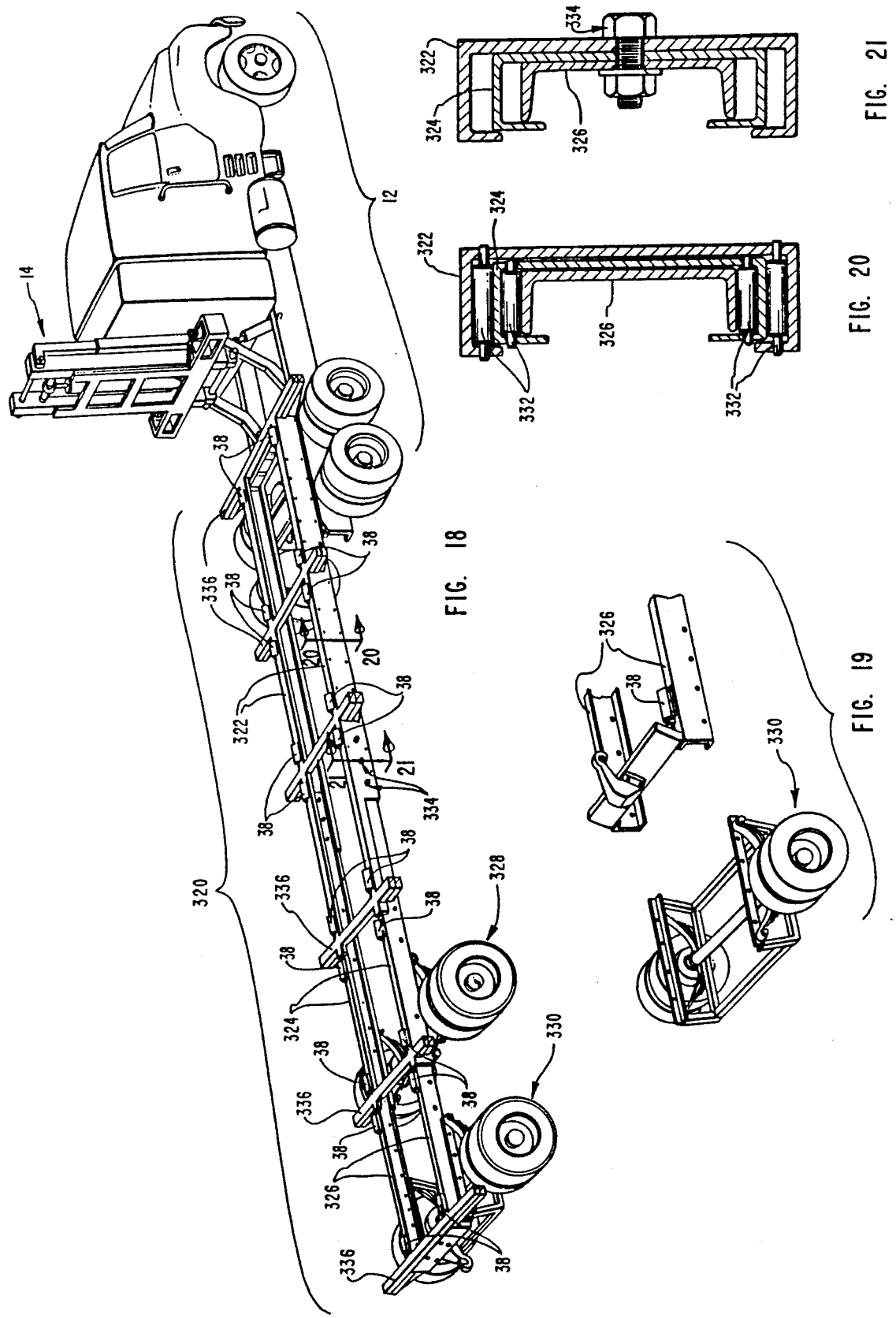

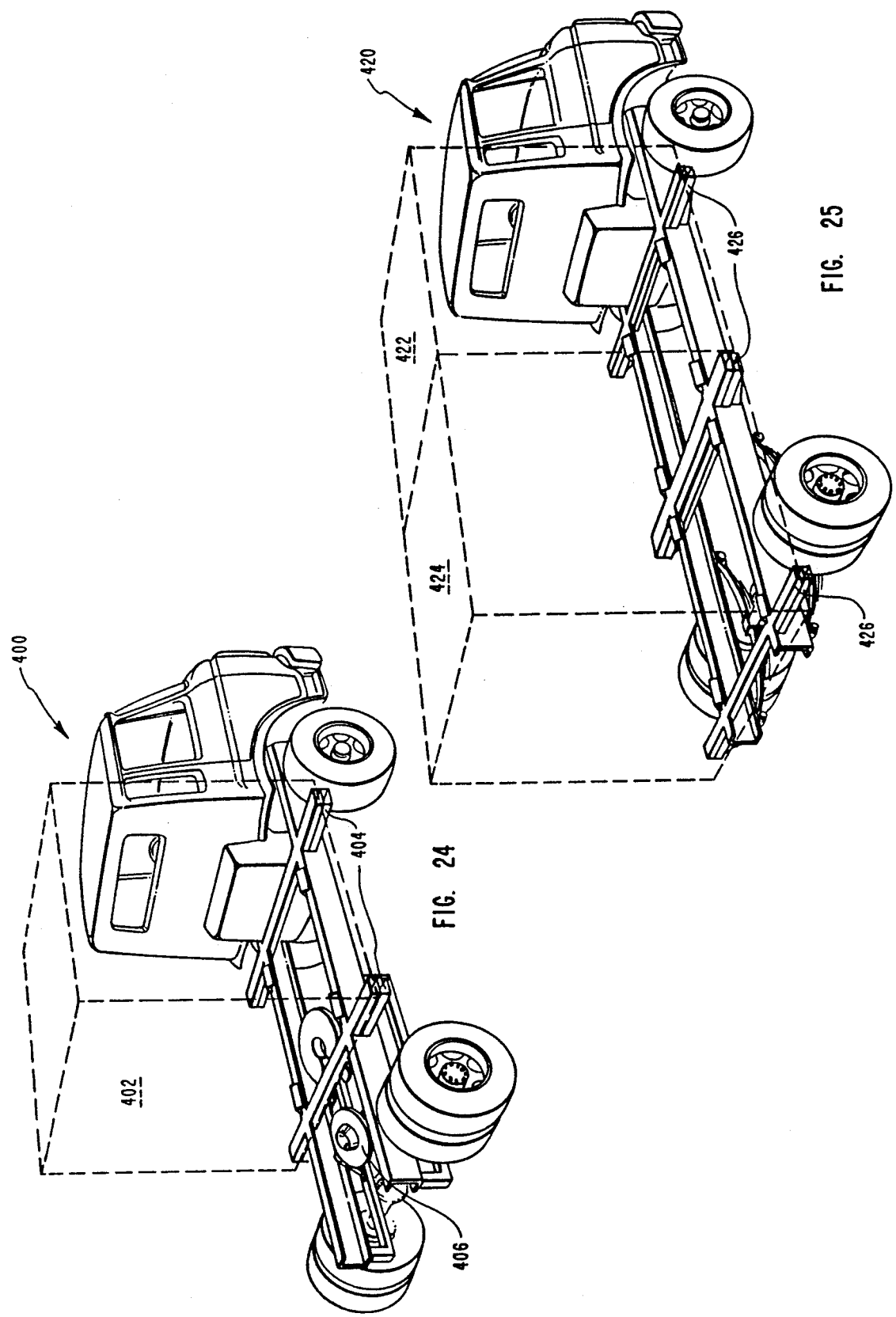

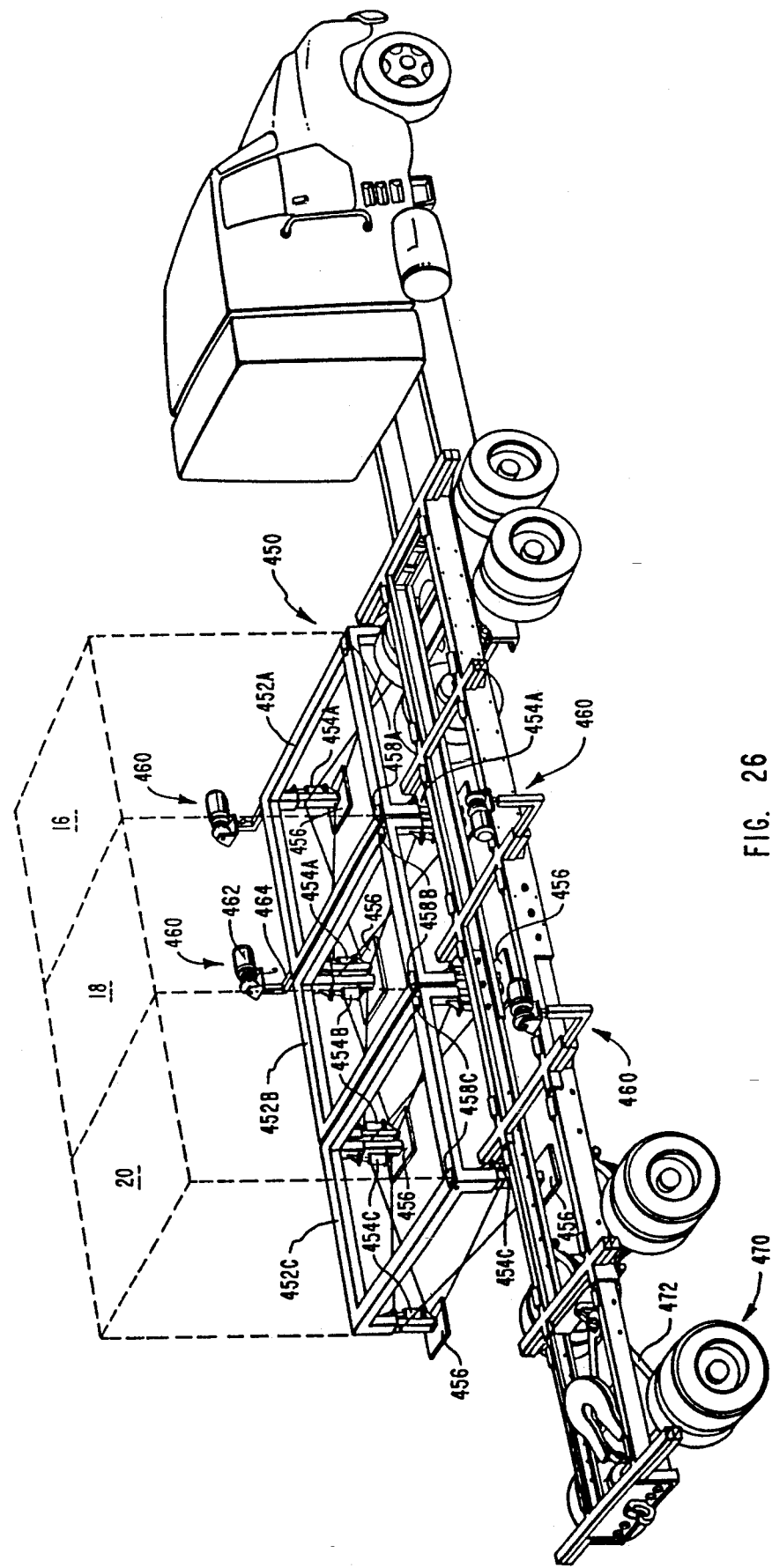

SECTIONAL VAN TRAILER HAVING DETACHABLE, INTERCHANGEABLE COMPARTMENTS CAPABLE OF FORMING A CONTINUOUS VAN BODY

RELATED APPLICATIONS

This application is a continuation of U.S. application Ser. No. 07/644,877, filed Jan. 23, 1991, for Sectional Van Trailer Having Detachable, Interchangeable Compartments Capable of Forming A Continuous Van Body, now abandoned, which is a continuation of U.S. application Ser. No. 07/296,575, filed Jan. 12, 1989, for Sectional Van Trailer Having Detachable, Interchangeable Compartments Capable of Forming A Continuous Van Body, now abandoned.

BACKGROUND

1. The Field of the Invention

This invention relates to transportation equipment used to move goods such as commercial freight and household belongings. More particularly, the present invention pertains to a system including a trailer frame onto which may be removably secured one or more of a plurality of interchangeable individual cargo compartments and all or some of the plurality of cargo compartments may be attached and interconnected to each other to form a continuous van body secured to the trailer frame and also may be removed for loading or unloading and secured to another trailer frame with other similar cargo compartments.

2. The Background Art

An efficient transportation system is essential to the operation of modern industrial societies. During the past several hundred years, the most common methods of transporting goods and materials from one location to a distant location has progressed from animal-drawn wagons, to steam and diesel-driven locomotives, to today where millions of tons of goods and materials are carried upon highways by semitrailer and tractor rigs which have become familiar sights on the world's highways.

The conventional semitrailer and tractor rig (so named because the trailer relies upon the tractor to carry part of its weight) often comprises a trailer 48 feet long, 13 feet high, and 8.5 feet wide. Importantly, the total cost of operating a semitrailer and tractor rig usually varies little between the cost of operating a semitrailer which is only partially full or a semitrailer which is completely full. Thus, by loading more items into a trailer before making a long-haul trip the cost of transporting each item to its destination will be lower than if fewer items were loaded into the trailer. Thus, there is great incentive in the long-haul trucking industry to use the largest possible trailer and to fill the trailers to their capacity during a trip.

While much of the trucking industry is involved with the transportation of commercial freight, a significant and economically important portion of the trucking industry is concerned with the transportation of household belongings. Significantly, the above-mentioned economic considerations of completely filling a trailer before leaving on a long-haul trip also applies in the case of moving household belongings. However, the nature of moving household belongings often makes it extremely difficult to completely fill a trailer of the type previously available in the industry, particularly on a return trip.

Like all customers of the trucking industry, household customers desire that their goods be picked up at their residence exactly at the scheduled time and delivered to their destination as soon as possible, or alternatively, at an exact date and hour. Commercial users of the trucking industry, in contrast to owners of household belongings, are often more willing and able to forgive delays in picking up and delivering fungible goods since individuals are often without furniture, cooking utensils, clothing, and personal belongings during the time that their goods are in transit. Moreover, the residential moving trade is extremely competitive and the residential customer's desire to have timely pickup and delivery works against having the lowest possible operating costs for several reasons such has those summarized below.

First, moving household goods often requires that a tractor-trailer combination be driven directly to the customer's residence. Because of government regulation or practical constraints, often times a full-sized trailer cannot be taken directly to a residence located on narrow streets or driveways, or on streets having weight limits below the weight of a loaded trailer.

Second, it is usually the case that a residential customer does not have enough household belongings to fill an entire trailer previously used in the industry. Such a trailer is 48 feet long and holds approximately 17 average rooms of furniture. Thus, unless the customer is willing to pay for the use of an entire trailer, the remaining third, half, two-thirds, or more, of the trailer must be shared with one or more other customers. Unfortunately, sharing a trailer requires that the pick-up and delivery dates may not be those desired by one or more of the customers sharing a trailer. Also, sharing a trailer often causes the time period between pick-up and delivery dates for one customer to be longer than it otherwise might be.

Third, customers are always concerned about the security of their goods. Sharing a trailer with another unknown person raises questions in customers' minds concerning the security of their goods.

Fourth, since the trailers most often used in the past to move household belongings were particularly adapted to the task, moving commercial goods in such trailers was not feasible. Thus, movers of household belongings have in the past been required to ensure that the trailer returned from a distant location with another load of household belongings, but as a practical matter always partially empty. Alternatively, if the tractor and trailer were required elsewhere before a load could be arranged, the trailer made the return trip empty at great expense to the operator.

In view of the foregoing difficulties and drawbacks found in the previous state of the art, it would be an advance in the art to provide a semitrailer which may be sectioned into a plurality of individually securable compartments and also allow the compartments to be interconnected to form a full-length continuous van body. It would also be an advance in the art to provide a semitrailer which includes a plurality of individual compartments, each compartment being capable of being off-loaded from the trailer, left at a location for loading, and later attached again to the trailer.

It would be another advance in the art to provide a plurality of cargo compartments which may be interchanged and secured to any number of properly equipped semitrailers. It would be a further advance in the art to provide a semitrailer which may be sectioned into individual compartments which are adapted to carry both household belongings and commercial freight.

It would be a still further advance in the art to provide a sectional van trailer and an accompanying tractor-mounted hoisting apparatus which allows a lone individual to both remove and secure an individual cargo compartment to the semitrailer at, for example, pick-up and drop-off locations and locations where cargo compartments are transferred from one semitrailer to another or are placed into storage. It would be yet another advance in the art to provide a semitrailer which protects its contents from contamination by dirt and moisture and securely holds the goods contained therein.

OBJECTS AND BRIEF SUMMARY OF THE INVENTION

In view of the foregoing, it is a primary object of the present invention to provide a trailer wherein the trailer may be sectioned into a plurality of individually enclosed compartments which are removably secured to a trailer frame.

It is another object of the present invention to provide a trailer wherein a plurality of individual compartments may be selectively removed from or attached to any number of properly equipped trailer frames.

It is still another object of the present invention to provide a trailer which is adapted to haul both household belongings and commercial freight.

It is yet another object of the present invention to provide a trailer having individual sections which are individually securable and which protect their contents from contamination by moisture and dirt.

A still further object of the present invention is to provide a sectional van trailer and an accompanying hoist apparatus which allows a lone person to remove individual compartments from, or secure them onto, any of a number of properly equipped trailer frames or truck frames.

It is a still another object of the present invention to provide a sectional van trailer which may be interconnected to form a continuous van body useable as a conventional van trailer and which includes a virtually flat van floor and straight walls thus allowing a fork lift to be maneuvered therein.

These and other objects of the invention can be learned from the following disclosure and from the practice of the invention.

Briefly stated, the present invention includes a plurality of van section means, or cargo compartments, which are each completely enclosed and which may be individually removed from the trailer frame and left at a location for loading or unloading. Each van section means provides a secure housing for its contents which protects its contents from contamination by moisture and dirt present in the surrounding environment as well as preventing theft of the contents.

When loading or unloading of each van section is complete, the van section may be hoisted onto a trailer frame, and secured thereto. The trailer frame includes a trailer hitching means such as one of many available in the art. Once the van sections are secured to the trailer frame, the combination is suitable for transportation on interstate freeways and highways. When attached to the trailer frame, a plurality of van sections, or van section means, are not merely containers which are placed on a trailer, but rather function together to form a strong, lightweight, and secure sectional van trailer. Each van section includes means for attaching the van section to an adjacent van section to provide strength not otherwise attainable with the same tare weight.

The van sections or cargo of the present invention each individually include a means for interconnecting adjacent van sections. For example, the first door means and the second door means of any two adjacent van sections may be opened to create a continuous van body or cargo space which may be loaded as any other van trailer.

When a van body is formed, the interior floor, wall, and ceiling surfaces are substantially straight and are without any disrupting obstructions. Also, just as the individual van sections provide a secure weather-tight housing for the items contained therein, when a continuous van body is created by interconnecting two or more sections, the joints between the two sections are weather-tight to protect the goods contained therein. Also, when attached to a trailer, the van sections interengage with each other to form a rigid, durable structure.

The trailer frame for use with embodiments of the present invention can be provided with a means for extending and retracting the length of the trailer frame. Thus, the overall length of the tractor/trailer combination, and the number of van sections which can be secured to the trailer frame, can be varied according to the needs of the user and to comply with government regulations.

While many other structures could be used, it is preferred that the door means used at the rear of the van sections be provided with either a swinging door having a double articulating hinge or a rollup door having a door support which acts to prevent damage to the door when the door is in the open position and is jostled about.

The double articulating hinge allows the swinging door to assume a closed position, an open loading position, or an open van position. In the open van position, the swinging door is secured against the interior wall of the van section so that the continuous van body space is unobstructed.

In order to provide the present invention with the greatest versatility, a hoisting means is provided to allow a lone person to lift the individual van sections onto, or off from, any properly equipped trailer or truck frame. In one embodiment, a hoisting means is mounted on the rear of a tractor with the mast of the hoisting means being moved between an operating position and a transport position by a means for moving the mast. A lifting means interconnects an individual van section to the movement means attached to the mast. The lifting means preferably may include a pair of detachable fork blades which are adapted to interconnect the hoist apparatus to the van section on many types of surfaces, even on uneven or sloping terrain. The van section may then be lifted off the trailer frame or the ground and moved about by a lone person maneuvering the tractor.

By use of the inventive concepts of the present invention, a trailer results which is equally suitable for transporting household belongings and commercial freight and which provides the great advantage of allowing a plurality of individual van sections to be secured to, and removed from, any of a number of properly equipped trailer frames or the van sections may be interconnected to form a larger, continuous van body on any of said trailer frames.

BRIEF DESCRIPTION OF THE DRAWINGS

FIG. 5 is a perspective view showing the overall construction of the hoist apparatus mounted on the tractor.

FIG. 6 is an exploded perspective view showing the structures used to secure the fork blades to the hoist mast.

FIG. 7 is a cross-sectional view of the fork blade secured to the hoist mast.

FIG. 8A is a top plan view of the embodiment illustrated in FIG. 1 showing the swinging doors in both a closed position and an open loading position.

FIG. 8B is a top plan view of the embodiment illustrated in FIG. 8A showing all of the swinging doors in an open van position.

FIG. 11A is a cross-sectional top view of another embodiment of the front swinging door which may be incorporated into each of the van sections described herein.

FIG. 11B is a cross-sectional perspective view of some of the structures used to lock the front swinging door of FIG. 11A into its closed position.

FIG. 11C is a partially cut-away perspective view of the front swinging door of FIG. 11A showing additional structures used to lock the door in its closed position.

FIG. 11D is a cross-sectional top view showing the front swinging door of FIG. 11A in greater detail.

FIG. 14 is an elevational view, partially in a cross-section, showing the structures used to attach the van sections to one another and to position the van section on the trailer frame.

FIG. 15 is a perspective view of another structure used to attach van sections together when secured to the trailer frame.

FIG. 18 is a perspective view of another presently preferred embodiment of the present invention including an extensible frame.

FIG. 19 is a perspective view showing the removable wheel and suspension assembly of the extensible frame illustrated in FIG. 18.

FIGS. 20 and 21 are vertical cross-sectional views taken along lines 20—20 and 21—21, respectively, of FIG. 18.

FIG. 24 is a perspective view of another presently preferred embodiment of the present invention.

FIG. 25 is a perspective view of yet another presently preferred embodiment of the present invention.

FIG. 26 is a perspective view of still another presently preferred embodiment of the present invention.

DETAILED DESCRIPTION OF THE PREFERRED EMBODIMENTS

The following disclosure provides a description of the presently preferred best known modes for carrying out the inventive concepts of the present invention. It is to be understood, however, that the inventive concepts claimed herein may be carried out and embodied in many different structures with the embodiments specifically illustrated herein representing the presently best known mode for carrying out the invention.

As previously discussed, and as is well-known in the industry, it is a goal in the trucking and moving industry to load as much as possible into a trailer before beginning a long-haul trip and also to travel the most direct route to the destination. In this way, the cost of transporting each item being hauled is lower than if fewer items are transported using the same trailer, tractor, and driver.

For example, with the present invention it is possible to much more efficiently move household belongings on long-haul trips than previously possible. This is due to the interchangeability of the cargo compartments, or van sections, which will be described shortly. Using the present invention, compartments loaded with goods destined for a variety of widely scattered locations may be transported to a regional or central hub and grouped with other compartments having destinations all on the way to the final destination. Thus, the circuitous routes often taken by moving trucks carrying the belongings of three to five people is avoided resulting in lower costs, fewer delays, and more satisfied customers. As will be appreciated by those familiar with the industry after understanding the present invention, it is a very significant advantage inherent in the present invention to be able to interchange, or transfer, compartments from one trailer to another either at a terminal or any location along a route.

Significantly, both governmental regulation and practical considerations limit the maximum dimensions and the gross weight of a vehicle operating on public roads. Because the maximum dimensions and gross weights are often limited by legal regulation, it is important that the trailers themselves be as light as possible in order to maximize the weight of cargo which can be carried. It is also important that the structure of the trailer allow the maximum possible interior volume without exceeding the height, width, and length restrictions placed on trailers traveling over public roads.

The considerations of minimizing trailer weight and maximizing useable trailer interior volume must be balanced against providing a trailer which is strong and durable. Since trailers must withstand the rigors of long use on the highway, maximizing the profit obtained by a trucking concern requires that a trailer be designed to provide the greatest possible cargo capacity while still providing safe and reliable operation. The present invention provides a trailer which better meets these considerations than previously available apparatus.

Figure 1:
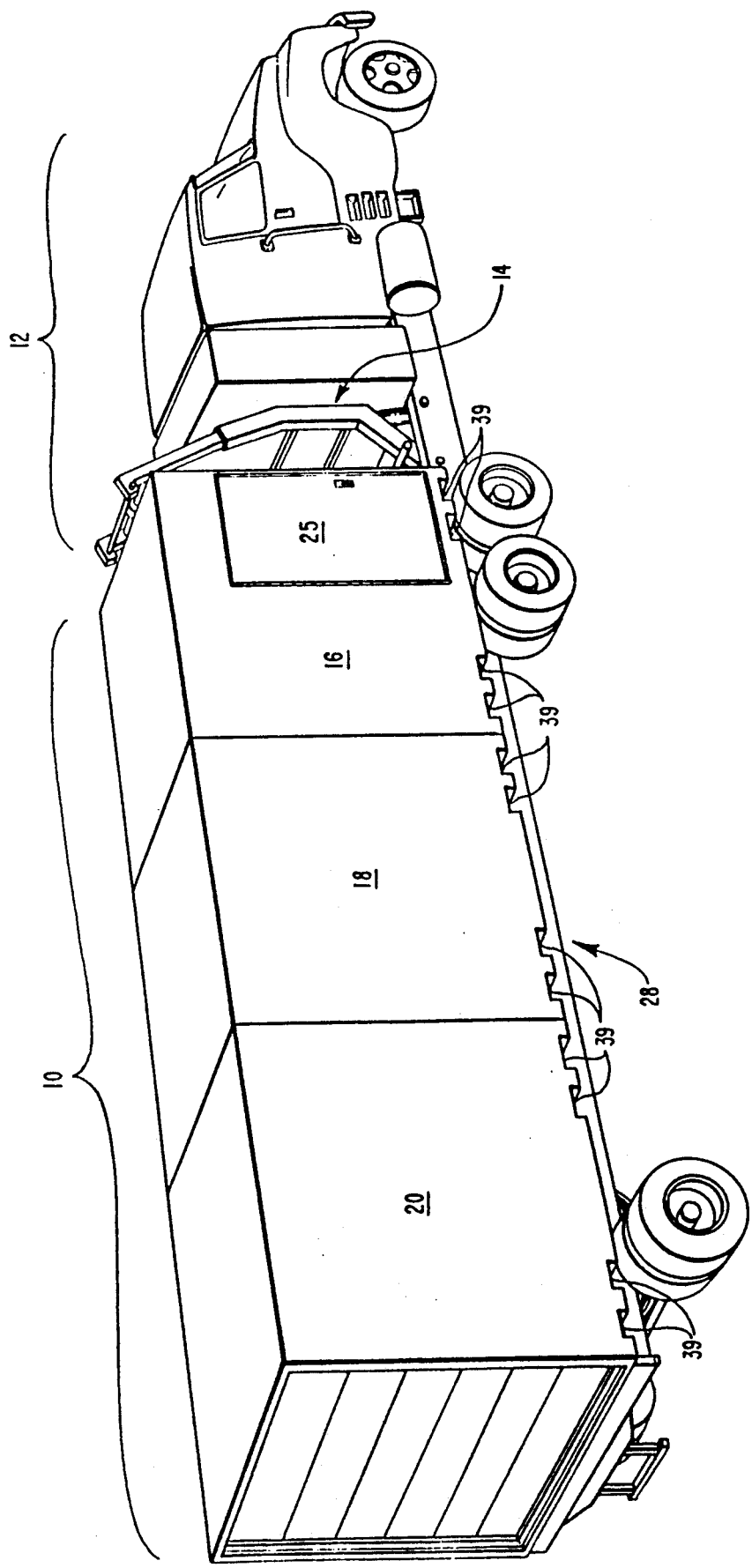
FIG. 1 is a perspective view of the presently preferred embodiment of the sectional van trailer of the present invention.

One presently preferred embodiment of the present invention is illustrated in the perspective view of FIG. 1. In FIG. 1, a tractor of the type generally used to pull semitrailers, is generally indicated at bracket 12. The tractor 12 may be one of many models well-known and commonly available in the industry.

Also represented in FIG. 1 is a trailer embodying the inventive concepts of the present invention. The trailer of the presently preferred embodiment is designated by bracket 10. The trailer 10 is a semitrailer which may be hitched to the tractor 12 by the conventional king pin hitching structure provided on the tractor 12 generally available in the industry.

As represented in FIG. 1, the trailer 10 is divided into a first van section 16, a second van section 18, and a third van section 20. Each of these van sections, or van section means, 16, 18, and 20, rest upon a lightweight trailer frame, hidden from view in FIG. 1 but generally designated 28, and may be removed from, and secured to, the trailer frame 28 or secured to any other trailer frame equipped according to the present invention. The use of a lightweight trailer frame allows more weight to be carried as cargo before the maximum weight limit is reached, as compared to equivalent sized containers carried on a conventional flat bed trailer or heavier trailer frame. Importantly, a conventional flat trailer would be impractical to use with the van sections described herein because of weight and height restrictions imposed upon the trucking industry. More details concerning the trailer frame and the structures used to secure the van sections, which may also be referred to as cargo compartments, will be provided later.

In order to allow a lone person to remove the van sections (16, 18, and 20) from, and attach them to, the trailer frame a hoist apparatus or hoisting means, generally designated 14 in FIG. 1, is provided. The hoist apparatus 14, mounted on the tractor 12, allows a lone truck operator to remove one or more van sections from the trailer frame leaving the van section, or sections, at a loading, unloading transfer, or storage location and then later resecuring the van section onto a properly equipped trailer frame once the loading, unloading, transfer is complete. As represented in FIG. 1, the trailer frame of the presently preferred embodiments must be provided with structures, such as brakes, lights, suspension, coupling devices and so forth, which are well-known to those skilled in the art.

Figure 2:
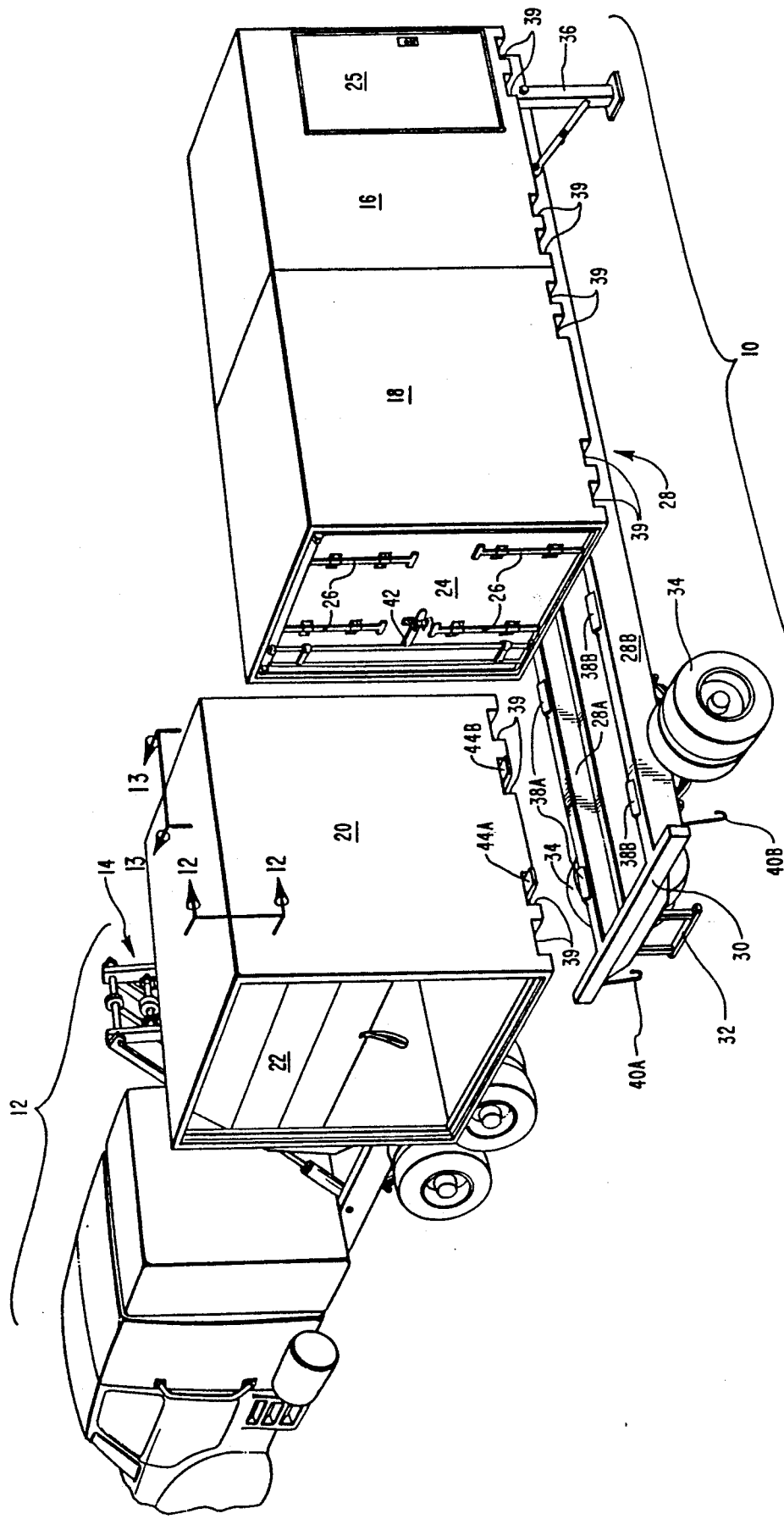
FIG. 2 is a perspective view of the embodiment illustrated in FIG. 1 showing a van section being removed from the trailer frame by a hoist apparatus mounted on the tractor.

FIG. 2 provides a perspective view showing the third van section 20 being removed from the trailer frame 28 using the tractor mounted hoist apparatus 14. The trailer frame 28 represented in FIG. 2 includes two frame elements 28A and 28B interconnected by an end frame element 30 provided with a bumper 32. The trailer frame 28 is supported on wheels 34 by way of a suspension apparatus which may be readily obtained or designed by those skilled in the art.

In the embodiment represented in FIG. 2, the trailer 10 has been unhitched from the tractor 12 and the trailer 10 left free-standing by way of two "landing leg" jacks, one of which is represented at 36, mounted near the forward end of the trailer frame 28. As will be fully appreciated shortly, one of the primary advantages of the present invention is that the individual van sections may be removed from the trailer frame and left at a location for loading or unloading. Furthermore, each van section 16, 18, and 20 provides a secure container for the goods disposed inside. Thus, the van sections protect their contents from theft and contamination by moisture and dirt.

Importantly, when the van sections are secured to the trailer frame and attached to each other, as described below, they act together to create a strong and reliable van trailer which may be left divided into individual van sections or, by moving the interior doors to their open van position, may be configured as a continuous van body with two or more van sections interconnected. Once interconnected as a continuous van body, the trailer may be loaded as any conventional van body trailer.

While the embodiment represented in FIG. 2 preferably includes three van sections, 16, 18, and 20, it is to be understood, however, that the present invention may include more or less than three van sections. Moreover, if necessary it is possible to secure only one or two van sections, for example van section 16 and 18 to the trailer frame for transporting goods on a short haul trip. Since, however, part of the trailer frame's strength is derived from the van sections attached thereto, the weight carried and length of a trip are limited when the trailer frame does not have a full complement of van sections attached thereto.

In some applications, it may be preferable to permanently attach the first van section 16 to the trailer frame 28. By permanently attaching the first van section 16 to the trailer frame 28, the structure of the first van section 16 may be used to strengthen and add rigidity to the trailer frame 28. Thus, the weight of the trailer frame may be reduced even further. Furthermore, if the first van section 16 is permanently secured to the trailer frame 28, the forward end of the first van section 16 may be fabricated without a front door. Thus, any difficulties which may accompany placing a door on the front end of the trailer where it is often exposed to penetrating moisture while moving at highway speed, can be avoided.

Nevertheless, embodiments of the invention may be designed to serve in applications where it is extremely advantageous to provide van sections which are completely interchangeable with one another and which may be secured to any trailer or truck frame equipped according to the present invention. For example, a number of van sections may be located in each city in a country. When necessary, a single van section may be individually delivered to a customer for loading (using single van section trailers or truck frames to be described later herein) and then picked up by a long-haul rig using the embodiment illustrated in FIGS. 1 and 2. Thus, in such applications a door is provided on both ends of each section to allow any van section to assume any position on a trailer frame. Importantly, appropriate sealing and weatherproofing structures are provided at each door as hereinafter described.

Importantly, in some localities the parking of a full-length trailer may be difficult if not impossible. By using the embodiments of the present invention, the full-length trailer may be parked a distance away from the desired loading and unloading location and a van section, such as van section 20 in FIG. 2, may be removed from the trailer frame and positioned in a driveway, street, parking lot, or any other convenient loading location. Once the van section 20 has been loaded, which may be several hours or several days after the van section is dropped off, the van section 20 may be secured to the same or a different trailer frame for transportation to the destination.

Represented in FIG. 2 is a swinging door 24 which may on some embodiments be provided on both ends of any van section. The swinging door 24 is provided with sliding bolts 26 and a latch apparatus 42, both of which are found on such doors in the industry. Alternatively, a rollup door may be incorporated into the van sections as represented at 22 on the rear end of van section 20. Also, as illustrated in FIG. 2, one or all of the van sections may be provided with a side door 25. More information concerning both the swinging doors 24 and the rollup door 22 which are adapted for carrying out the present invention will be described later.

In order to ensure that each of the van sections are properly positioned on frame elements 28A and 28B, positioners 38A and 38B are provided on the upper surface of each frame element 28A and 28B. The positioners 38A and 38B engage complementing structures on the bottom of each van section which will be described later.

The van sections are also fabricated with cut-out portions 39 to provided clearance for the positioners when the van sections are removed from, or placed onto, the trailer frame as will be described later. Also represented in FIG. 2 are hold down hooks 40A and 40B which, in cooperation with other structures, serve to secure the third van section 20 onto the trailer frame 28. More information concerning the just mentioned structures will be provided shortly.

Represented in FIG. 2 adjacent the lower edge of van section 20 are a pair of fork blades 44A and 44B preferably positioned within tubular structures located under the floor of the van section 20. It will be appreciated that the inventive concept of allowing each van section to be removed and left at location for loading, unloading, transfer, or storage provides advantages and flexibility not before known in the industry.

Figure 3:
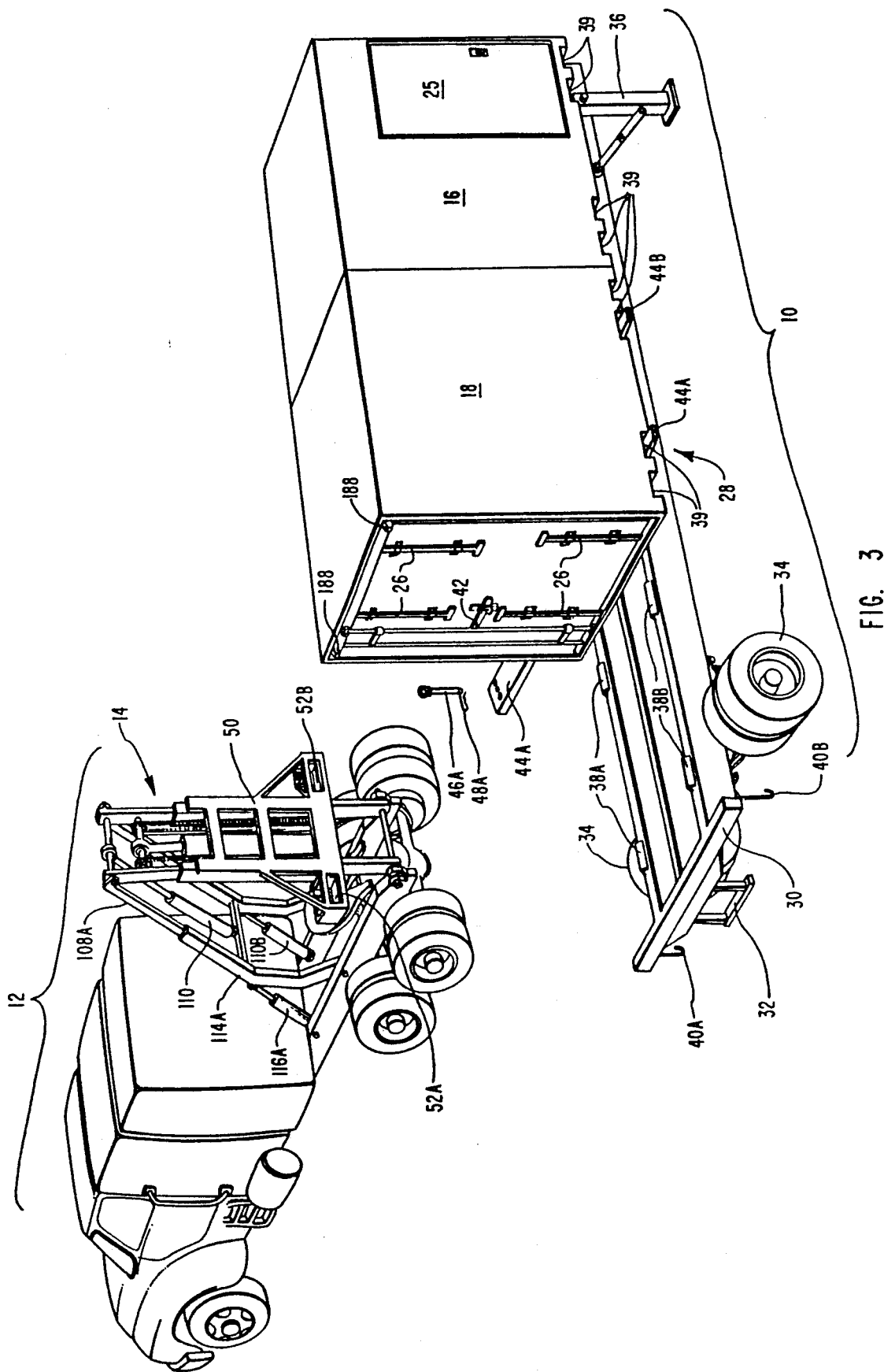
FIG. 3 is a perspective view of the embodiment illustrated in FIG. 2 with the components of the hoist apparatus being brought into position to lift a van section from the trailer frame.

In FIG. 3, the trailer frame 28 is shown with two van sections (16 and 18) secured thereto with preparations being made to remove van section 18 from the trailer frame 28. In order to remove a van section from the trailer frame 28, the trailer 10 is unhitched from the tractor 12. The hoist includes a fork blade support 50 provided with two fork blade receptacles 52A and 52B.

In FIG. 3, the hoist apparatus is shown provided with four hydraulic rams which will be familiar to those skilled in the art. Among the functions served by hydraulic rams is the function of raising and lowering the fork blade support 50 and the function of moving the mast between a storage position and an operating position. More information concerning the hoist apparatus will be provided shortly.

When moving van section 18, or any other van section, using the hoist apparatus, fork blades 44A and 44B are first removed from their storage location on the tractor 12, and inserted under the van section floor, for example van section 18. Preferably, each van section is provided with two tubular structures, under the van section floor, each of which are adapted to receive one fork blade 44A or 44B.

Figure 4:
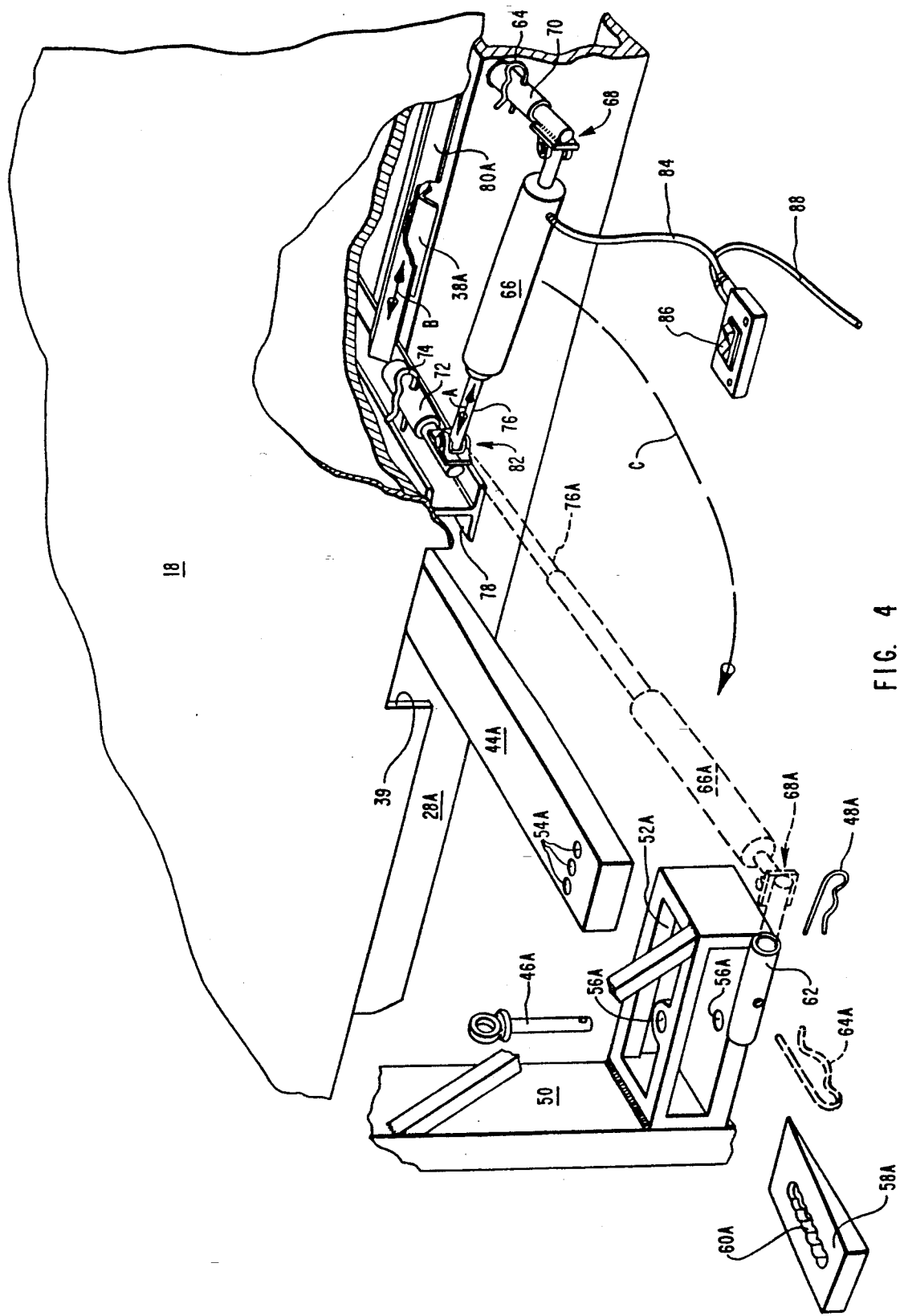
FIG. 4 is a partially cut away perspective view showing the apparatus used to secure the fork blades to the hoist mast and a hydraulic ram used to position the van section on the fork blades and the trailer frame.

Since the van sections form an interengaging van body when secured to the trailer frame and to each other, it is necessary to separate the van sections from each other using the procedure which can be best described in connection with FIG. 4. In FIG. 4, one of two identical hydraulic rams 66 is shown, each of which is preferably one of many bi-directional hydraulic rams available in the industry and well-known to those skilled in the art. The two hydraulic rams 66 are provided with fluid under pressure from a pump (not illustrated) mounted on the tractor 12 and conveyed to the hydraulic ram by fluid lines 84 and 88. The direction of the fluid flow, and the direction of the ram movement, is controlled by switch 86.

The tractor 12 is then backed up to a position perpendicular to the side of the van section, such as van section 18 in FIG. 3, so that the fork blade receptacles 52A and 52B will be closely aligned with the fork blades protruding out from the van section 18. As an aid to accomplishing this procedure, guide marks may be painted on the side of the van section to help the operator of the tractor find the proper position during backing.

As will be explained in greater detail shortly, each of the van sections interengage with each other to form a weather-tight and structurally stable van body. Thus, it is necessary to slide each van section apart from its neighbor before it can be removed from the trailer frame. As shown by the arrow labeled "B" in FIG. 4, each van section is able to slide longitudinally on the trailer frame due to the action of positioners (38A and 38B) and provided on the frame elements 28A and 28B and a corresponding receptacle (80A).

It will be appreciated that it may be advantageous to place friction-reducing materials on the contacting surfaces of the positioner 38A and receptacle 80A. With a receptacle being provided for each positioner (as shown in FIG. 3) the van sections may be slid together or pushed apart by one or both of the two hydraulic rams as necessary for securing the van sections to, or removing them from, the trailer frame.

As shown in FIG. 4, the fixed cylinder of each ram 66 is provided with a hinge assembly 68 which may be inserted into receptacle 70 and held in place by clip 64. Likewise, the moving rod 76 of ram 66 is provided with a hinge assembly 82 which is received by receptacle 72 attached to the van section and held in place by clip 74. Thus, as the moving rod 76 moves in the directions indicated by arrow A, van section 18 also slides in the corresponding directions indicated by arrow B. In this way, the van sections may be slid together or apart.

Before the van sections have been slid apart, the fork blades, such as 44A in FIG. 4, are inserted under the van section. Each fork blade is provided with a plurality of bores 54A as shown in FIG. 4. After the truck operator has positioned the tractor so that each fork blade receptacle, such as shown at 52A, is in alignment to receive the end of each fork blade 44A, the hoist mast is raised or lowered to position the fork blade receptacles 52A and 52B to receive each fork blade in turn. If the ground under the trailer and tractor is uneven or sloping, such as is common on normal streets, each blade may be inserted into its receptacle at a different vertical level from the other.

As will be appreciated by those skilled in the operation of conventional fork lift apparatus, the standard fixed, attached forks of a conventional fork lift could only be inserted under the floor of the van sections if both forks of the fork lift and the trailer frame itself are on the same horizontal plane on level ground. In practical use on city streets with hills, driveways, and gutters, and so forth, this is generally not the case. Hence the described detachable, individually aligned, and inserted fork blades are essential to the practical operation of individually aligned, and inserted fork blades are essential to the practical operation of the hoist apparatus.

As suggested in FIG. 4, after the fork blade 44A is received by the fork blade receptacle 52A, a wedge 58A is then positioned within the fork blade receptacle and post 46A is inserted through bores 56A, 54A and 60A. Thus, as will be more fully explained shortly, the fork blades are held securely in position during the hoisting of the van section.

Once the fork blades have been securely positioned, the truck operator can then raise the van section from off the trailer frame using the hoist. Preferably, however, for increased safety each of the fixed cylinder ends of the hydraulic rams 66 should be removed from receptacle 70 and swung in the direction of arrow C to the position represented at 66A so that the hinge assembly, in the position shown at 68A, is received by receptacle 62 on the fork blade support and secured in place using the clip shown at 64A. The operator may then lift the van section a few inches from off the trailer frame and then pull it securely against the hoist using both rams as necessary. When the van section is resting on the forks, one or both of the hydraulic rams 66A may then be used to pull, push, or hold, van section 18 on the fork blades. The rams 66 may also be used to place the van section onto positioner 38 when securing the van section back onto the trailer frame.

It should be realized that the structures represented in FIG. 4 may be used to move a van section between the trailer frame and the ground, a storage rack, or another trailer frame. It will be further appreciated that structures different than, or in addition to, those represented and described herein may be used to carry out the procedure, or equivalent procedures, herein described.

Further information concerning the structure of the hoist apparatus will be provided in connection with FIGS. 5-7.

As will be appreciated, the present invention advantageously provides a means for allowing a lone truck operator to handle the van sections. This need is met without requiring that a fork lift or other similar bulky device be transported with the embodiment. Importantly, the hoist apparatus of the embodiments may be easily operated and adaptable for a variety of conditions and terrain. For example, it is not uncommon to find a loading or unloading site that is on a narrow street, driveway, or on a hill or uneven ground. The hoist apparatus represented in FIGS. 5-7 allows efficient operation under all these conditions.

As shown in FIG. 5, a principal component of hoist 14 is a mast 100. The mast 100 may be one of many commonly available in the art for use with fork lifts or may be specifically constructed for use with embodiments of the present invention. The mast 100 is provided with a hydraulic ram 102 and other components, which serve as a movement means, and which provide the raising and lowering functions by way of chains 104 which are connected to fork blade support 50.

The hoist in FIG. 5 is shown in the operating position. When the hoist 14 is not being used, it assumes a position directly behind the cab of tractor as shown in FIG. 18. When not being used, the hoist takes up a minimum of space and, according to the procedure to be described, may easily be moved into the operating position.

As can be seen in FIG. 5, when the hoist 14 is in the operating position, the two mast securing posts, one of which is illustrated at 126B, are secured in place by corresponding cradle members and hooks, one of each being shown at 122B and 124B, respectively. As a safety feature, cradle members and hooks are provided with switches (not shown) which cause hydraulic rams 116A and 116B to remain operational until both cradle members and hooks have securely received both mast securing posts. Once both mast securing posts are received by the cradle members and hooks, the rams 116A and 116B are disabled so as to not interfere with the operation of ram 110. Ram 110 may then be used to tilt the mast 100 forward or backward while moving a van section.

Hoist support arms 114A and 114B are pivotally mounted on the tractor frame by way of bolts 118A and 118B. The position of hoist support arms 114A and 114B is controlled by hydraulic rams 116A and 116B. Each of the hydraulic rams 116A and 116B are pivotally connected to the tractor frame by bolts (one of which is shown at 120B in FIG. 5).

Mast support extension arms 108A and 108B telescopically extend from, and retract into, mast support arms 114A and 114B as indicated by the arrow labeled "D" in FIG. 5. Mast support extension arms 108A and 108B are pivotally connected adjacent the top of the hoist mast 100 by way of bar 106. The extension or retraction of mast support extension arms 108A and 108B is controlled by ram 110. By extending or retracting ram 110 the extension or retraction of mast support extension arms is correspondingly carried out. The hydraulic ram 110 is anchored to the mast support arms 114A and 114B by cross member 112 as shown in FIG. 5. The mast support arms, the mast support extension arms, as well as the rams and other structures associated therewith, serve as a means for moving the mast between the operating position and the transport position and allow an operator to tilt the hoist apparatus back while moving a van section.

Thus, the structure represented in FIG. 5 allows a lone truck operator to move the hoist between a transport position and an operating position. It will be appreciated that those skilled in the art will readily be able to devise the appropriate hydraulic control systems necessary to implement the embodiment represented in the figures. Alternatively, other structures can be used to carry out the same or equivalent functions.

Due to the positioning of the hoist at the rear of the tractor, it would be very difficult for a truck operator to precisely position the fork blades 44A and 44B under the van section if the fork blades were rigidly attached to the fork blade support 50. Thus, it is preferred that the procedure previously described be adopted wherein the fork blades 44A and 44B are inserted under the floor of the van section to be moved and then bringing the tractor-mounted hoist into position. Preferably, fork blade receptacles 52A and 52B are fabricated large enough so that they present an easy target for the truck operator to maneuver the fork blades into. For example, the fork blade receptacles may have a cross sectional area equal to a range from about two to about eight times larger than the cross sectional area of the fork blades.

Incorporating oversized fork blade receptacles 52A and 52B into the fork blade support 50 is particularly important when the hoist is to be used on uneven or sloping terrain where precise positioning of the fork blade receptacles may be very difficult for a truck operator sitting in the tractor cab maneuvering the tractor backwards while looking in rear view mirrors. Thus, incorporating oversize blade receptacles 52A and 52B greatly facilitates efficient use of the hoist apparatus.

As represented in FIGS. 6 and 7, once the fork blade 44B has been properly positioned in the fork blade receptacle 52B, wedge 58B is also inserted into the fork blade receptacle 52B on top of the fork blade 44B as indicated by the arrow E in FIG. 6. The position of the fork blade 44B and a wedge 58B is adjusted until bores 60B provided in the wedge 44B, and bores 54B provided in the fork blade 44B, are in alignment with bores 56B provided in fork blade receptacle 52B. Once alignment is accomplished, a post 46B is inserted through all the bores and a retaining clip 48B is inserted as shown in FIG. 7.

In the foregoing described fashion, a structure is provided which allows the fork blades to be easily positioned and held in position while the van section is lifted and moved. Moreover, due to the flexibility provided by incorporation of oversized fork blade receptacles, the fork blades may be positioned under a van section, and the van section lifted by the hoist, even on rough, uneven, or sloping terrain. The incorporation of such a lifting means structure provides great advantages over previously available devices.

As indicated previously, one of the great advantages of the present invention is that one or more of the van sections may be interconnected to form a continuous van body comprising two or more van sections. In addition to providing a continuous van body, the present invention provides a structurally strong trailer body and frame by attaching each van section to an adjacent van section and securing each van section to the trailer frame itself.

As mentioned previously, each van section may be equipped with either a rear rollup door or a rear swinging door. It will be appreciated that when a rollup door is used, positioning the door to the open van position leaves an unobstructed doorway and allows for a continuous van body to be formed. When swinging doors are used in each of the van sections, the configuration represented in FIGS. 8A and 8B is preferably used.

Represented in the top view of FIG. 8A are three van sections 16, 18, and 20. The first van section 16 of the illustrated embodiment is provided with a sealed front wall 172 and sidewalls 160 and 166. If desired, front wall 172 may be provided with an aerodynamic shape or shroud to decrease wind resistance. Alternatively, as previously mentioned, if the first section is to be interchangeable with all other van sections, it may be configured identically to van sections 18 and 20.

Preferably, the walls (160, 162, 164, 166, 168, and 170 as represented in FIG. 8A) of each van section are fabricated from a rigid, strong material such that a minimum of internal frame members are required. Most desirably, it is preferred that the material from which the walls are fabricated be sufficiently strong such that internal frame members are required only in the interior corners of the van sections.

Also, it is preferred that the walls and swinging doors of the van sections are equipped with conventional sockets which receive restraining bars and cargo securing straps. The restraining bars may then be used, in cooperation with sheets of material such as plywood, to form shelves and dividers within the van sections.

Each van section 16, 18, and 20 is provided with a rear door 158, 154, and 150, respectively. Each of the rear doors is shown in a closed position at 150, 154, and 158, and in an open load position at 150A, 154A, and 158A. Thus, it can be seen that the rear door of each van section can seal the rear opening of the respective van section when in the closed position. Each rear swinging door may also be swung outward and against the outer wall of the van section to an open loading position as shown at 150A, 154A, and 158A. When in the open loading position, the swinging doors are completely out of the way during loading or unloading. Alternatively, the rear door may be a rollup door to be described shortly.

In FIG. 8A, van sections 18 and 20 are also provided with a forward door 156 and 152, respectively. Forward doors 156 and 152 are provided with a hinge which allows them to assume one of the two positions shown in FIG. 8A, the open van position being shown at 152 and 156 with the closed position being shown at 152A and 156A.

Provided in FIG. 8B is the same view provided in FIG. 8A, showing each of the swinging doors being configured in the open van position. As can be seen in FIG. 8B, with all the doors properly positioned, the continuous van body is formed which allows cargo to be placed anywhere from the forward end of the trailer to the rear end of the trailer using, for example, a fork lift. Also, large single pieces of freight may extend from one section to another. For example, an automobile, a large roll of carpet, or a boat may be placed therein.

Figure 10A:
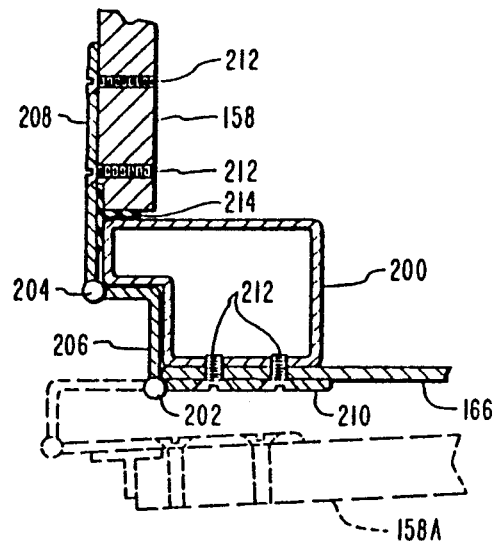
FIG. 10A is a horizontal cross-sectional view taken along line 10A—10A of FIG. 8A showing in greater detail the operation of the articulating hinge incorporated into the swinging door of the illustrated embodiment.

The double articulating hinge represented in FIGS. 8A and 8B is shown in greater detail in FIG. 10A. Represented in FIG. 10A is the corner frame member 200 to which is attached wall 166 and first hinge plate 210 by way of screw 212. The double articulating hinge includes a first hinge plate 210, a second hinge plate 206, and a third hinge plate 208. The second hinge plate 206 is pivotally connected to the first and third hinge plates by pins 202 and 204, respectively. The third hinge plate 208 is attached to door 158 by screws 212.

As can be seen in FIG. 10A at 158A, the structure of the double articulating hinge allows the door 158A to be folded back against the van section wall 166 to the open loading position.

Each door is also provided with a gasket, such as that indicated at 214 in FIG. 10A, which preferably may be a neoprene rubber gasket which ensures that a secure seal against moisture and dirt is formed to protect the contents of the van section. As will be appreciated by examining FIG. 10A and FIG. 8A, the configuration of corner frame member 200 and the double articulating hinge allows the adjacent van section to structurally engage each other. Thus, a strong van body is formed. Furthermore, it should be appreciated that a door means utilizing the double articulating hinge may also be fabricated as the front door of the illustrated embodiments if desired.

Figure 9A:
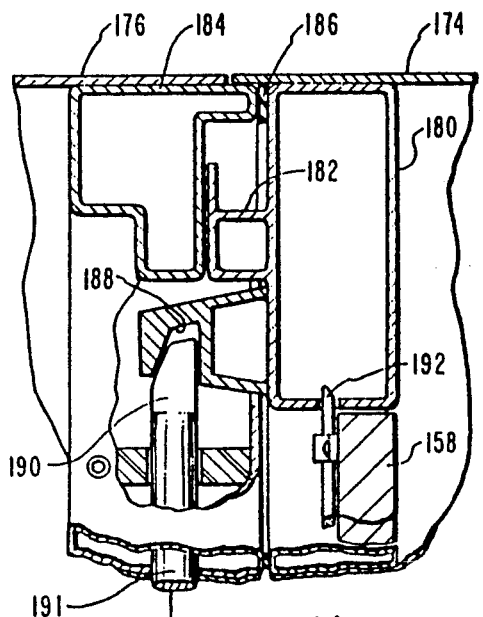
FIG. 9A is a vertical cross-sectional view taken along line 9—9 of FIG. 8A showing a portion of the apparatus used to attach the van sections of the embodiment to one another.

FIG. 9A provides a vertical cross-section taken along line 9A—9A of FIG. 8A. In the vertical cross-sectional view, the roof 174 of van section 16 and the roof 176 of van section 18 are shown being connected to frame member 180 and frame member 184, respectively. It will be noted that the roof 174 and the frame member 184 are configured so as to overlap, thus increasing the structural integrity of the interconnected van sections and providing an improved weather seal. Moreover, a gasket 186 is included to prevent entry of moisture and dirt. Still further, a water channel 182 is formed in the frame member 180 so as to divert any moisture which penetrates beyond the gasket 186 away from the contents of van section and to drain harmlessly to the outside of the van section.

Also represented in FIG. 9A is a securing notch 188 extending from frame member 180. Also shown is the top portion of securing post 190. After the van sections are slid together on the trailer frame, a securing post 190 is pressed into the securing notch 188 preferably by a screw apparatus which is illustrated in FIG. 9B.

Figure 9B:
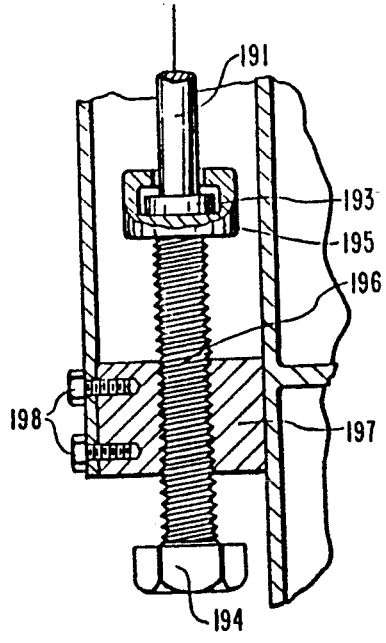
FIG. 9B is a vertical cross sectional view showing the lower portion of the structure represented in FIG. 9A.

In FIG. 9B, a securing post shaft 191 is provided with a foot 193 which is held captive in cap 195. The securing post shaft 191 is connected vertically to securing post 190 and, as the securing post shaft 191 is raised and lowered, the securing post engages and disengages the securing notch 188.

As can be seen in FIG. 9B, the cap 195 is attached to a threaded shaft 196 which is disposed through a threaded block 197. The threaded block 197 is attached to the van section frame by way of bolts 198 so that as the threaded shaft is turned using a head 194 (also shown in FIG. 14) the securing post engages or disengages the securing notch 188. As clearly shown in FIG. 14, the heads 194 are accessible from the underside of each van section thus eliminating the need for a potentially dangerous ladder climb to operate the structure.

Figure 10B:
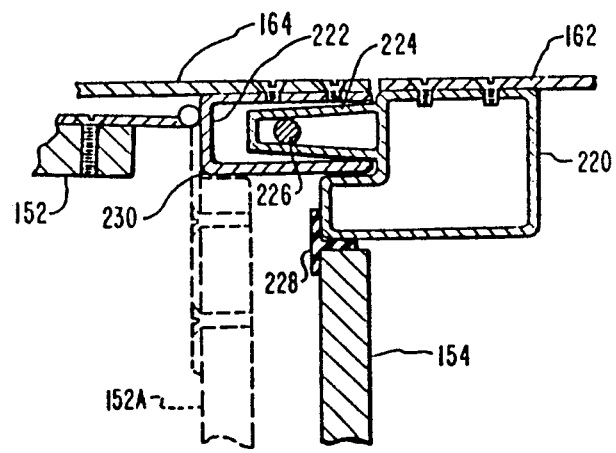
FIG. 10B is a horizontal cross-sectional view taken along line 10B—10B of FIG. 8A showing in greater detail the interengaging portions of two compartments or van sections.

Provided in FIG. 10B is a horizontal cross-sectional view taken along line 10B—10B of FIG. 8A showing the corner frame member 220 of van section 18 as well as corner frame member 230 of van section 20. As can be seen in FIG. 10B, a ridge 224 protrudes from frame member 220 and is received by channel 222 in frame member 230 to provide a rigid interconnection between the two van sections. Also represented in FIG. 10B are swinging doors 152 and 154. In order to provide additional protection against entry of dirt and moisture, a gasket 228 is provided in association with the door 154 of van section 18.

FIGS. 11A-11D provide additional detail concerning additional embodiments of the present invention and the configuration of the front door which may be used in each van section and the structures associated therewith. As mentioned previously, the penetration of water and dirt into the van section through the front door must be carefully considered if the van section is to be placed at the front position on the trailer frame and subjected to wet and dirty conditions at highway speeds. Moreover, with the van sections being loaded by either professional movers or the customers themselves, the front door of the van section must be strong enough to resist deformation when the load shifts against it, particularly as may occur during an emergency stop. The structures represented in FIGS. 11A-11D meet the challenges raised by these concerns.

Shown in FIG. 11A is a front door 231 which is provided with a hinge 241. The hinge 241 may be a cylindrical post attached to the end of the door and which may be attached to the van section frame in any one of many ways known to those skilled in the art. The front door swings between an open van position (as shown at 231A) and a closed position (as shown at 231). Three front door brace bars 233 and a front door floor brace 234 are shown in FIG. 11A in their storage position. FIG. 11A also illustrates how van section frame members 232A-232D act as male and female components to interengage one another to form a rigid and strong body when attached together.

FIG. 11B shows the structure of the front door floor brace 234 in greater detail. The front door floor brace 234 prevents the door from being opened when the van section is to be loaded individually. The right angle portion of the front door floor brace 234 is placed at the intersection of the van section floor with the front door and locked into place by way of a "quick twist" bolt mechanism 238 which engages a fixture on frame member 235A and which locks into place with less than a 360° rotation according to designs known in the art. Also represented in FIG. 11B are gaskets 237 and door seal 236 which further serve to prevent entry of water and dirt into the van section.

FIG. 11C provides a representation of one of the front door brace bars 233 in its working position. Each of the front door brace bars fit through rings 240A and into recesses 240B which are provided in van section frame members 235A and 235B. Each of the front door brace bars 233 may be installed or removed by lifting one end of the bar 233 through the ring 240A and placing, or removing, the other end of the bar 233 into, or from, the recess 240B.

A similar arrangement may be provided for bars 233 in their storage position shown in FIG. 11A. As will be appreciated by examining FIGS. 11A and 11C, use of the front door brace bars 233 strengthens the front door 231 and will prevent its failure in the event of a shifting load during an emergency stop. Also shown in FIG. 11C is a door support roller 239 which may preferably be included to remove some of the weight of the front door 231 from the hinge 241.

FIG. 11D is a cross-sectional top view of the front door 231 and the structures associated therewith. In keeping with the objective of keeping the interior each van section secured from the surrounding environment, additional gaskets, indicated at 237, are represented on the several of the structures shown in FIG. 11D.

As mentioned previously, the embodiments of the present invention may incorporate swinging doors or rollup doors depending upon the particular application intended for the embodiment. For example, swinging rear doors, while generally sturdier and providing a better seal against moisture and dirt, also present the hazard of allowing the contents of the van section to uncontrollably come tumbling out once the door is unlatched. Thus, it may be preferable to equip van sections which are loaded by inexperienced individuals loading their own personal and household belongings with rollup doors. In this way, the hazard of injury caused by poorly packed items uncontrollably tumbling out once a swinging door is unlatched can be avoided.

While rollup doors provide the advantage of safer operation for inexperienced users of the van sections, it is a well-known attribute of commonly available rollup doors that if the rollup doors are left in the up position for any length of time while the trailer is in motion, the rollers on the rollup door will soon be destroyed. This is due to the characteristic that the rollers are supported only on one of their ends. Importantly, represented in FIGS. 12 and 13 is a presently preferred embodiment of a rollup door which is particularly adapted for use in the van sections described herein and which routinely may be left in the up position while the trailer is moved about without causing any damage to the door or to the door rollers.

Figure 12:
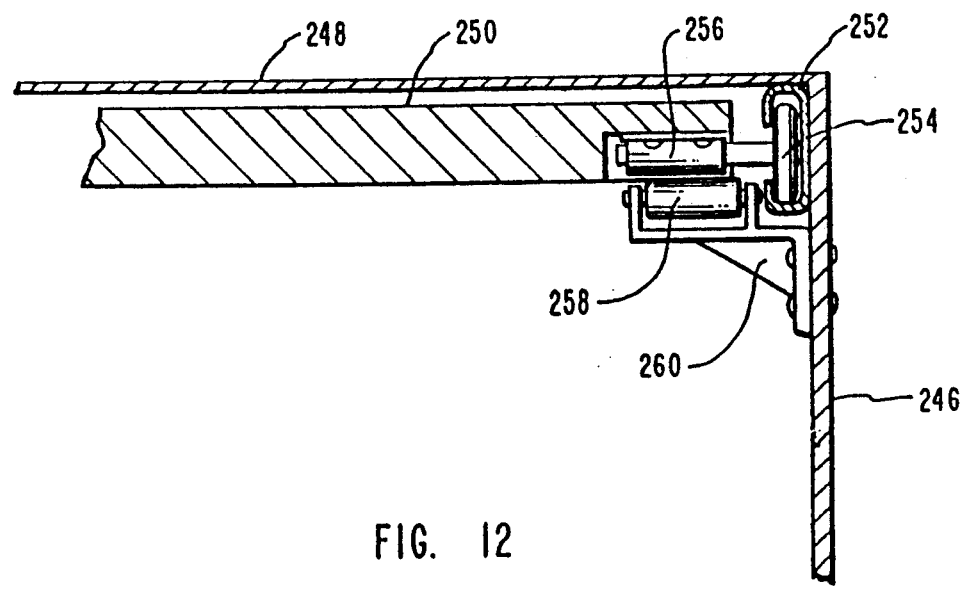
FIG. 12 is a vertical cross-sectional view taken along line 12—12 of FIG. 2 showing the structure of a rollup door, in the up position, and the rollup door support of the present invention.

As represented in FIG. 12, the rollup door, one section of which is represented at 250, is shown in cross-section in relation to the van section wall 246 and the van section roof 248. The rollup door used in the embodiment represented in FIGS. 12 and 13 may be one of the many which are commonly available in the art. Such doors comprise a plurality of door sections as well as a plurality of rollers, one of which is shown at 254, which roll up and down on a track 252. In the open position, the door sections are virtually horizontal and parallel to the roof of the van section as shown in FIGS. 12 and 13.

Each rollup door section is provided with at least one roller 254 on each of its ends. The roller 254 is held in place by one end thereof on the door section by brackets such as that illustrated at 256 in FIG. 12. However the bracket 256 and the roller 254 are not sufficiently strong to routinely support the weight of the door section 250 when the trailer is in motion. When the vehicle is in motion, the jostling of the door sections causes a rapid failure of the bracket and the roller.

Figure 13:
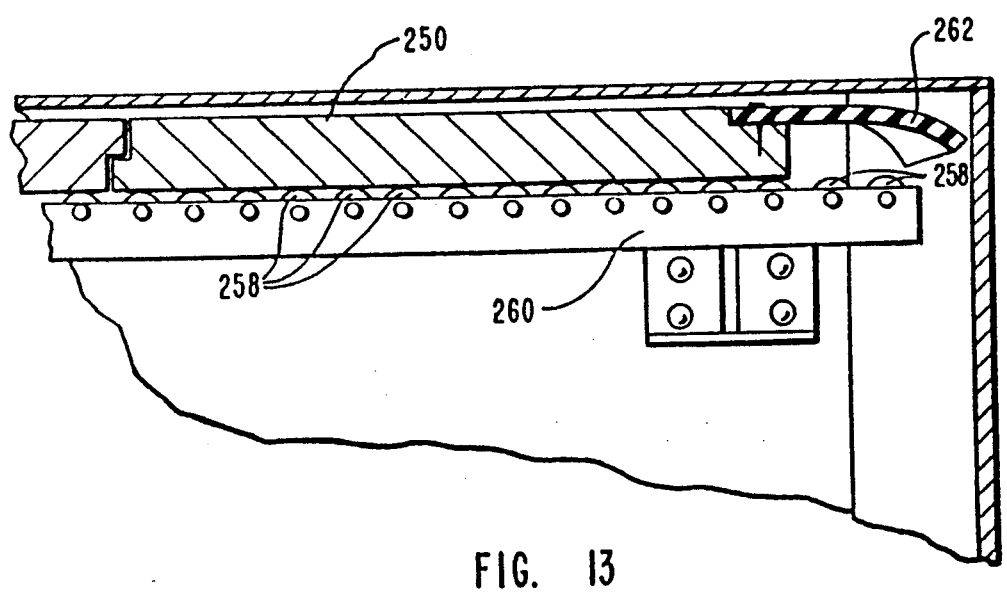
FIG. 13 is a vertical cross-sectional view taken along line 13—13 of FIG. 2 further showing the structure of the rollup door support illustrated in FIG. 12.

In order to economically allow use of rollup doors in embodiments of the present invention disclosed herein, a supplemental door support roller 258 hold up each door section 250 as shown in FIGS. 12 and 13. The plurality of supplemental door support rollers is readily installed using a bracket 260 fabricated for this purpose. By supporting each supplemental door support roller on both of its ends, the door support rollers may readily support the weight of the door sections, even when they are jostled about.

Thus, it will be appreciated that the inclusion of the supplemental door support rollers 258 allows the weight of the door sections to be supported by the supplemental rollers and thus prevent damage to the rollup doors while traveling on a highway. Using the rollup door embodiments represented in FIGS. 12 and 13, either rollup or swinging doors, or a combination of both, may be readily incorporated into embodiments of the present invention as the need arises. Moreover, the supplemental door support rollers described herein have application in all aspects of the trucking industry where rollup doors are used.

As is explained earlier in connection with FIGS. 8A-11, the upper corners of each van section are attached to the adjacent van section in order to form a strong and rigid van body. The lower portions of each van section are also secured to one another and to the trailer frame as will be explained in connection with FIGS. 14-17.

FIG. 14 is an elevational view of the rear door of a van section and a cross-sectional view of trailer frame members 28A and 28B. Shown in FIG. 14 are positioners 38 provided on each of the trailer frame members as well as supports 80 provided on the bottom of each van section. Also represented in FIGS. 14 and 15 is the lower van section interconnecting assembly which includes bracket 270 which retains shaft 272 captive. When it is desired to join the lower portions of van sections together, shaft 272 is swung into position, as represented at 272A, and nut 274 is tightened against bracket 276. Thus, using the structures represented in FIG. 15 the lower portions of two van sections may be securely held together. It will be appreciated that the structures represented in FIGS. 11 and 15 comprise one means for interconnecting the van sections.

Figure 17:
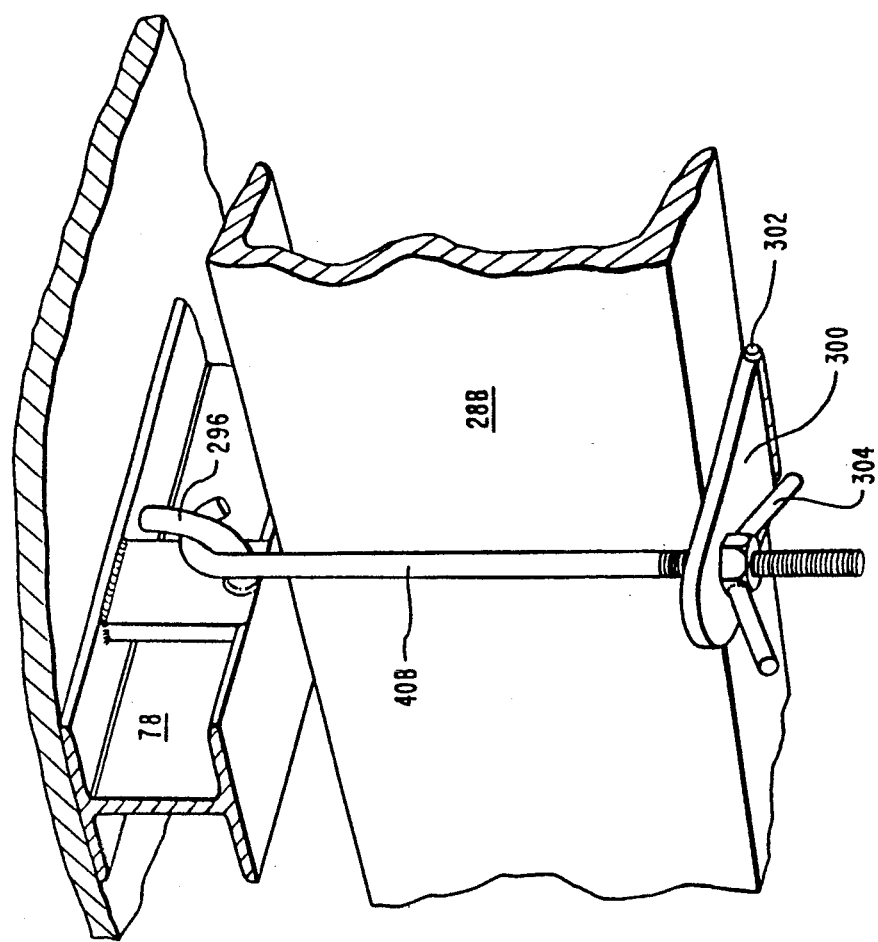
FIG. 17 is a perspective view of another structure used to secure a van section to the trailer frame.
Figure 16:
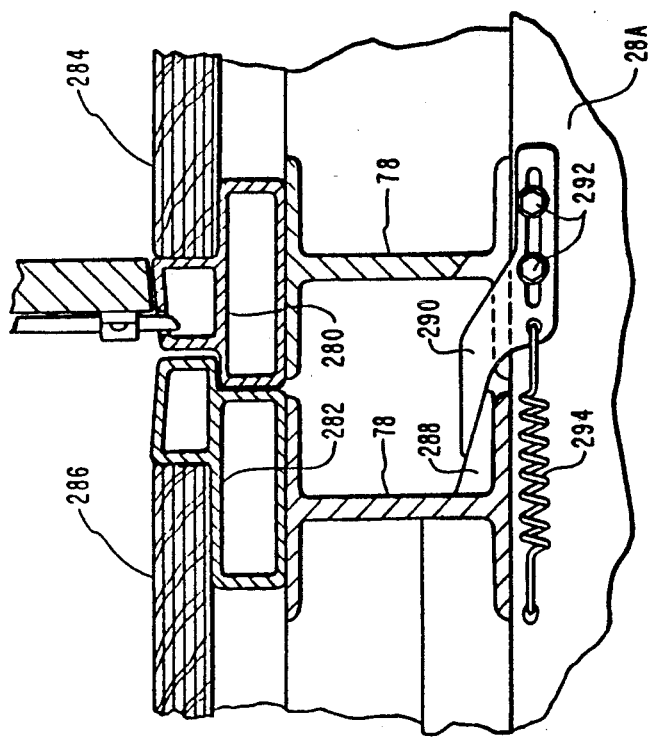
FIG. 16 is a cross-sectional view showing structures used to secure the van sections to the trailer frame.

Represented in FIGS. 16 and 17 are structures which are used to secure the van sections to the trailer frame members and serve as one possible securing means for securing the van sections to the trailer frame. Represented in FIG. 16 is a vertical cross-sectional view through two van sections. The floors 284 and 286 which are supported by frame members 280 and 282, are positioned, and frame members 280 and 282 are formed, so that their interengaging surfaces allow the two van sections to lend structural stability and rigidity to each other.

Moreover, the floors of the two van sections have a virtually uniform height. Thus, when the embodiments described herein are interconnected as a continuous van body the entire interior volume of the van may be used without restriction. Furthermore, having a virtually uniform floor height throughout all the van sections facilitates use of devices such as hand trucks and forklifts inside the van sections.

The van sections may be secured to trailer frame members, for example trailer frame member 28B, by use of the structure represented in FIG. 16. Represented in FIG. 16 is a hold-down plate 290 which is biased by a spring 294 and allowed to slide horizontally by bolts 292. One of support member I-beams 78 is provided with a hold-down wedge 288 which is engaged by the hold-down plate 290. Since the hold-down plate 290 is biased by spring 294, as the van sections are vibrated as they travel down the highway, the contact between the hold-down plate 290 and hold-down wedge 288 becomes tighter during use. Preferably, a plurality of hold-down plates 290 and their associated structures are used with each van section.

The structure represented in FIG. 17 is used to secure the rear end of the last van section to the frame members and may also be used to secure the corners of each van section to the trailer frame. As shown in FIG. 17, hooked shaft 40B engages a hook 296 provided on the van section support member 78. The hooked shaft 40B is connected to the trailer frame member 28B by way of a plate 300 which is connected to the trailer frame member 28B by a hinge 302. One end of the hooked shaft 40B is threaded and inserted through a bore provided in the plate 300. A wing nut 304 is tightened to exert the proper amount of downward force on the hooked shaft 40B and the van section. In addition to, or as an alternative to, the previously described structures, bolts and nuts may be used as means to secure the van sections to the trailer frame.

As mentioned previously, it may be desirable to include more than three van sections on a single trailer frame. Thus, the embodiment represented in FIG. 18 is provided with an extensible trailer frame upon which between three and five van sections may be included. Furthermore, those familiar with the industry will appreciate that various governmental regulations, as well as practical considerations, place different limits on the maximum length of a semitrailer from one locality to the next. Also, while it may be impossible to maneuver the fully extended trailer in some locations, it may be very possible to maneuver the same trailer shortened to accommodate only three van sections in the same location. Moreover, shorter trailers can often be conveniently parked in driveways and parking lots.

Illustrated in FIG. 18 at bracket 12 is a tractor equipped with a hoist 14 shown in its transport position. The extensible trailer, designated by bracket 320, includes frame members 322, 324, and 326. Frame members 324 and 326 are provided with removable positioners 38 in order to allow retraction of these frame members. Because of the potential length of extensible trailer frame 320, two wheel and suspension assemblies 328 and 330 are provided.

As shown in FIG. 19, wheel and suspension assembly 330 may be repositioned or removed from frame members 326. In order to facilitate smooth extension and retraction of the frame members, roller bearings, as represented in FIG. 20 at 332, are provided. Once the extensible frame has been extended or retracted to the proper length, bolts and nuts, generally indicated at 334 in FIG. 21, are used to lock the frame in the proper position. It will be appreciated that support members 336 and the various means used to secure the van sections to the trailer from 320 may be designed to be moved from position to position on the trailer frame to accommodate a varying number of van sections.

In many cases, it would be advantageous to be able to deliver one or more van sections using a smaller, less expensive truck or trailer. For example, in locations where loading and unloading space is extremely limited, the arrangement illustrated in FIG. 22 may be used. Since each van section 18 and 20 forms a compartment wherein the contents thereof are secure and safe from theft, dirt, and moisture, the van sections may be transported individually.

Figure 22:
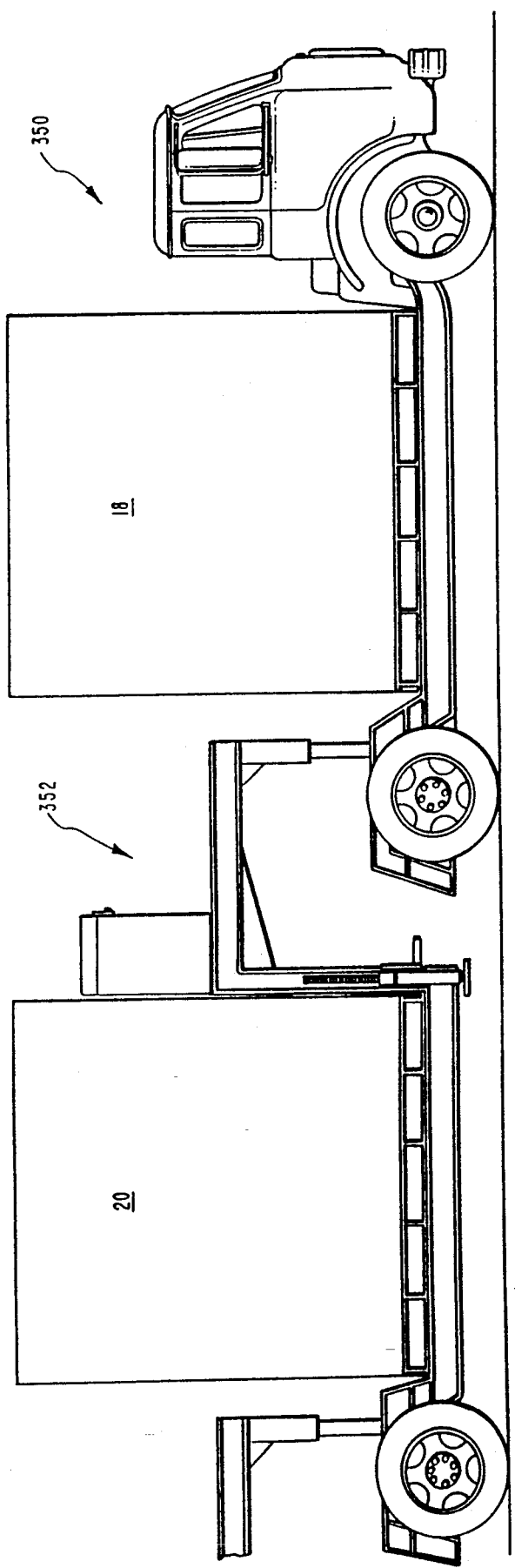
FIG. 22 is a side view of another presently preferred embodiment of the present invention wherein each van section is provided with an individual trailer.

As shown in FIG. 22, a flatbed truck 350 and trailer 352 arrangement may be readily adapted for transporting the van sections for short trips. For example, the arrangement represented in FIG. 22 may be dispatched to one or more loading locations where the van sections are loaded. Once loaded, the van sections may later be returned to a central terminal where they may be secured to a semitrailer frame, such as represented in FIGS. 1-17, in preparation for a long-haul trip.

Figure 23B:
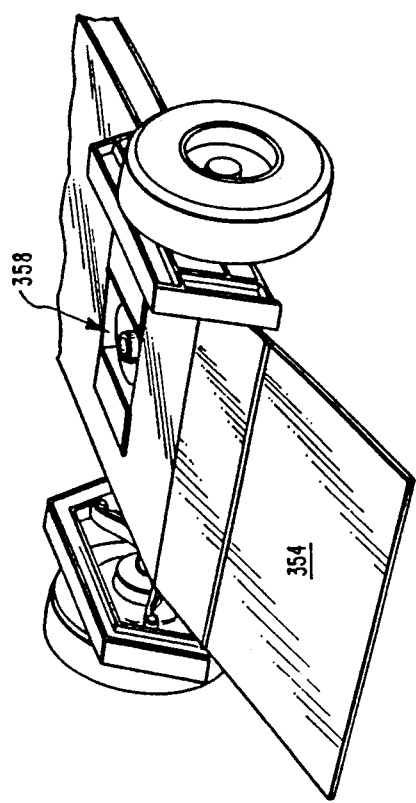
FIG. 23A and 23B are perspective views showing the construction of the individual trailers illustrated in FIG. 22 in greater detail.
Figure 23A:
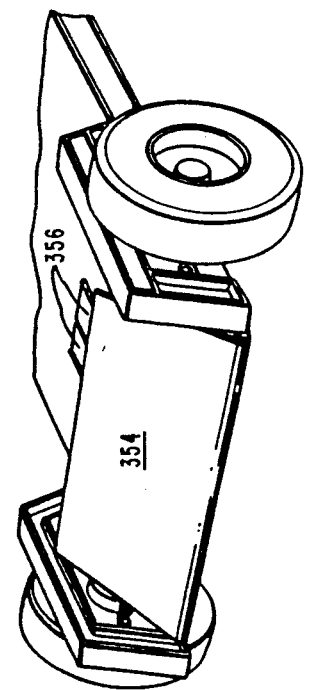

Preferably, both the truck 350 and trailer 352 are provided with a ramp 354. The ramp 354 is shown in the up position in FIG. 23A and in the down position in FIG. 23B. The ramp facilitates loading each individual van section. It is also preferred that both the truck 350 and the trailer 352 be provided with a hitch, as generally designated 358 in FIG. 23B, to allow additional trailers to be pulled. Furthermore, when the hitch is not in use it is preferred that a cover for the recessed hitch 358 be provided such as doors 356 shown in FIG. 23A.

Advantageously, the inventive concepts of the present invention may be readily adapted to allow moving and storage businesses in small municipalities to utilize the van sections described herein. Since the volume of long-haul moving in a small municipality is low, the cost of owning and maintaining a semitrailer and tractor equipped according to the present invention may be too great to justify. A small local moving and storage business can, however, easily justify the cost of acquiring and maintaining one or two van sections such as described herein.

Since a small moving and storage business may hesitate to make the investment in the truck 350 and trailer 352 illustrated in FIG. 22, it is readily possible to adapt van trucks which are generally already owned and used by small moving and storage companies to the present invention as will be described in connection with FIGS. 22-25. Illustrated in FIG. 24 is a tractor 400 used to pull semitrailers on local trips. The tractor 400 has been equipped with support members 404 upon which a single van section, represented at 402, may be placed. Tractor 400 is also preferably provided with a supplemental hitch 406 to pull a trailer such as trailer 352 represented in FIG. 22.

Represented in FIG. 25 is a van truck 420 which is often equipped with a conventional van body. The van truck 420 in FIG. 25 is provided with cross support members or bolsters 426 upon which two van sections, represented at 424 and 422, can rest. Also, the van truck body generally owned by a small moving and storage company which fits onto the van truck 420 can be modified to roll off from, and roll on, the truck frame.

It will be appreciated that securing and attaching structures such as those described previously herein can preferably be added. Furthermore, with the addition of a ramp, the van sections secured on trucks 400 and 420 may be loaded at a residence and returned to the central terminal. There the van sections may be rolled off the truck onto storage stands (as shown in FIG. 26) and the van truck body rolled back onto its own frame.

Upon arrival of a tractor and trailer (as shown in FIG. 1) which is making a long trip, the van sections can be transferred thereto as described previously or rolled on or off using the winches 460 as shown in FIG. 26. Moreover, the trucks represented in FIGS. 24 and 25 are usually already owned by most moving and storage businesses, and in the case of the truck represented in FIG. 25, the two van sections may be interconnected as a continuous van body and the truck used as in a conventional manner from day to day.

If the van sections of the present invention are to be used by a local moving and storage business, but additional flexibility is desired, the embodiment represented in FIG. 26 may be utilized.

FIG. 26 provides a perspective view of a tractor hitched to an extensible trailer frame according to the present invention. Also represented is a van section stand 450 including a plurality of stand frames 452A-452C. Each stand frame 452A-452C is able to support one van section of the present invention when the van section is not secured to a trailer frame or truck. Each stand frame 452A-452C rests on four foot pads 456. Each corner of the stand frame 452A-452C is provided with a hydraulic jack 454A-454C which is adapted to raise or lower the frame to match the height of the truck or trailer.

Using the structures represented in FIG. 26, van sections (represented at 16, 18, and 20) may be slid between the gussets provided on a truck or trailer frame and the stand frames 452A-452C. Rollers 458A-458C may preferably be provided to ease the sliding movement of the van sections. Also, several winch assemblies 460 may be included to pull the van sections onto the trailer frame or the stand frame.

As represented in FIG. 26, each winch assembly includes a motor, transmission, and reel mechanism 462 which is mounted on a winch support arm 464. Each support arm may be received by a support member on the trailer frame and the members of stand frames. Thus, the winch assemblies may be moved to any position needed but also be securely held during use.

Also shown in FIG. 26 is what is commonly referred to in the trucking industry as a converter gear 470. Such a converter gear is commonly used in the industry to make the second semitrailer in a "train" into a full trailer. The converter gear 470 attaches to the pintle hook on the rear of the extensible frame by way of arms 472 and to the extensible frame itself to support the most rearward portion of the extensible frame. The converter gear 470 may be used as an alternative to the wheel and suspension assembly 330 represented in FIG. 18. The converter gear 470 provides the additional tandem axle needed to support the additional weight when five van sections are secured to the extensible frame.

As will be appreciated from the foregoing, the present invention provides advantages not heretofore available in the industry. The present invention greatly facilitates the process of moving household belongings by allowing a van section to be left at a residence and loaded at a time convenient to the customer. The van section may be left on the ground adjacent the residence or may be left on a trailer adapted for carrying a single van section. Thus, a long-haul tractor and semitrailer rig need not be detained at the residence while a trailer is loaded allowing for more efficient use of equipment and for more satisfied customers.

Moreover, all of the van sections, or cargo compartments, may be identical, and thus interchangeable, with one another, from trailer to trailer. In this way, van sections may be transported from various locations around a country and used in the locality where it is convenient to leave the van section after its contents have been unloaded.

Particularly significant is the feature of the present invention to interconnect one or more van sections to form a continuous van body. The continuous van body allows cargo, either commercial freight or household belongings, to be loaded in a fashion similar to any conventional van body truck or trailer. The continuous van body feature of the present invention may be used to allow a single household to use two or more van sections. Alternatively, the continuous van body feature allows the embodiment to be used to haul commercial freight, for example, on a return trip after unloading household belongings at one or more destinations or one van section secured to a trailer may contain commercial freight while another van section contains household belongings.

The tractor mounted hoist apparatus also provides a great advantage over previously available apparatus. With the tractor mounted hoist apparatus, a lone truck operator can remove and secure the van sections on slightly sloping or uneven terrain. The hoist apparatus in the described embodiments assumes a convenient transport position on the tractor when it is not being used.

Each of the van sections of the described embodiments provides protection for its contents against contamination by moisture and dirt in the surrounding environment and from theft. Still further, the present invention allows those working in the industry to more easily satisfy customers with acceptable pick-up and delivery dates. Even further, the present invention may be economically implemented so that both large and small moving and storage businesses may benefit therefrom.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A trailer for hauling both household goods and commercial freight and capable of being pulled behind a vehicle having a hitch, the trailer comprising:

a lightweight trailer frame;

trailer hitching means, positioned adjacent to a first end of the lightweight trailer frame, for hitching the trailer to the vehicle;

at least one pair of wheels rotatably mounted on the lightweight trailer frame adjacent to a second end of the lightweight trailer frame;

a plurality of van section means, each van section means comprising a floor, a roof, two walls, two door openings positioned opposite each other and means for forming a weather-tight barrier in the two door openings, and at least one side door, each of said doors being individually and securable to form a sealed compartment adapted for storing and transporting a variety of household goods or commercial freight, wherein at least one of the doors is a rollup door and further comprising support means for supporting the weight of the rollup door when said door is in the up position, said support means comprises a plurality of horizontal rollers which support the rollup door;

securing means for removably securing at least two of the van section means onto the lightweight trailer frame such that any one of the van section means may be selectively secured to and removed from the lightweight trailer frame, the van section means being removable from the lightweight trailer frame from at least one side of the lightweight trailer frame such that at least one of the van section means can be removed from the lightweight trailer frame regardless of its position on the lightweight trailer frame;

a force producing device comprising a hydraulic ram;

means for pivotally receiving the force producing device on a van section means such that the van section means is movable longitudinally or laterally on the trailer frame as the force producing device is operated; and means for interconnecting adjacent van section means secured to the lightweight trailer frame, the means for interconnecting comprising means for attaching two van section means together such that at least two van section means are interconnected and secured onto the lightweight trailer frame to form a rigid and strong body and such that a plurality of van section means may be interchanged among a plurality of lightweight trailer frames and interconnected to one another to form a continuous van body providing an enclosed space including the lengths of two or more van section means.

2. A trailer capable of being pulled behind a vehicle having a hitch as defined in claim 1 wherein each van section means comprises a self-contained compartment having two doors located opposite each other on the compartment, each door being individually securable to protect the contents of the compartment from entry of moisture and dirt.

3. A trailer capable of being pulled behind a vehicle having a hitch as defined in claim 1 wherein the trailer hitching means comprises a king pin positioned at the front end of the trailer.

4. A trailer capable of being pulled behind a vehicle having a hitch as defined in claim 1 wherein each van section means comprises two doors positioned opposite each other.

5. A trailer capable of being pulled behind a vehicle having a hitch as defined in claim 4 wherein at least one of the two doors is a swinging door.

6. A trailer capable of being pulled behind a vehicle having a hitch as defined in claim 5 wherein at least one swinging door comprises a double-articulated hinge.

7. A trailer capable of being pulled behind a vehicle having a hitch as defined in claim 6 wherein at least one swinging door can assume an open position wherein the swinging door is disposed completely out of the van section means, a closed position wherein the swinging door separates the interior and the exterior of the van section means, and an open van position wherein the door opening of the van section means is unobstructed and the swinging door is disposed completely within the van section means.

8. A trailer capable of being pulled behind a vehicle having a hitch as defined in claim 6 wherein the swinging door is provided with a resilient gasket around at least a portion of its perimeter.

9. A trailer capable of being pulled behind a vehicle having a hitch as defined in claim 1 wherein the attachment means comprises means positioned adjacent the two upper corners of the van section means for attaching two van section means together.

10. A trailer capable of being pulled behind a vehicle having a hitch as defined in claim 9 further comprising means positioned adjacent a lower edge of each van section means for attaching two van section means together.

11. A trailer capable of being pulled behind a vehicle having a hitch as defined in claim 1 further comprising means for positioning the van section means laterally on the trailer frame.

12. A trailer capable of being pulled behind a vehicle having a hitch as defined in claim 11 wherein the means for positioning the van section means on the trailer frame comprises a pyramidal-shaped elongated structure oriented longitudinally on the trailer frame and at least one complementary shaped recess provided on the bottom of the van section means.

13. A trailer capable of being pulled behind a vehicle having a hitch as defined in claim 1 wherein each of the plurality of van section means includes a metallic frame having a member positioned on the interior of each edge of the van section means, the frame members being configured such that four frame members of a first van section means interengage four frame members of a second van section means when the first and second van section means are attached together to form a continuous van body.

14. A trailer capable of being pulled behind a vehicle having a hitch as defined in claim 1 wherein the plurality of van section means comprises three van section means.

15. A trailer capable of being pulled behind a vehicle having a hitch as defined in claim 1 wherein each of the plurality of van section means is substantially configured as a cubic shape.

16. A trailer capable of being pulled behind a vehicle having a hitch as defined in claim 1 wherein each of the plurality of van section means is substantially rectangularly shaped.

17. A trailer capable of being pulled behind a vehicle having a hitch as defined in claim 1 wherein the means for interconnecting comprises means for joining two adjacent van sections means to form at least a portion of a continuous van body.

18. A trailer capable of being pulled behind a vehicle having a hitch as defined in claim 1 wherein all of the plurality of van section means are identical.

19. A system for transporting either household goods or commercial freight by way of a semitrailer pulled by a tractor, the system comprising:
 a lightweight trailer frame;
 at least one pair of wheels rotatably mounted adjacent to a first end of the lightweight trailer frame;
 a plurality of van sections, each of the van sections comprising a floor, a roof, two walls, two door openings positioned opposite each other, each door opening extending substantially from the floor to the roof and between the two walls, means for forming a weather-tight barrier in each of the two door openings, and a side door, said side door being openable and securable to form a weather-tight barrier between the interior and the exterior of each van section, wherein at least one of the means for forming a weather-tight barrier comprises a rollup door and further comprising support means for supporting the weight of the rollup door when said door is in the up position, said support means comprises a plurality of horizontal rollers which support the rollup door;
 means for individually securing the plurality of the van sections to the lightweight trailer frame such that the individual compartments may be removed over the side of the lightweight trailer frame in any sequential order and interchanged among a plurality of lightweight trailer frames;
 means for positioning the van sections laterally on the trailer frame;
 a force producing device comprising a hydraulic ram;
 means for pivotally receiving the force producing device on a van section such that the van section is movable longitudinally or laterally on the trailer frame as the force producing device is operated; and
 means for interconnecting adjacent van sections together such that a plurality of van sections may be joined to form a rigid and strong body when interconnected and secured onto the lightweight trailer frame and such that the plurality of van sections form a continuous van body including the length of two or more van sections.

20. A system for transporting goods as defined in claim 19 further comprising a king pin hitch positioned at the front end of the trailer frame.

21. A system for transporting goods as defined in claim 19 wherein at least one of the two doors is a swinging door.

22. A system for transporting goods as defined in claim 19 wherein at least one swinging door comprises a double-articulated hinge.

23. A system for transporting goods as defined in claim 22 wherein at least one swinging door can assume a plurality of positions including an open position wherein the swinging door is disposed completely out of the compartment, a closed position wherein the swinging door separates the interior and the exterior of the compartment, and an open van position wherein the door opening of the compartment is unobstructed and the swinging door is disposed completely within the compartment.

24. A system for transporting goods as defined in claim 22 wherein the swinging door is provided with a resilient gasket around at least a portion of its perimeter.

25. A system for transporting goods as defined in claim 19 wherein each of the compartments comprises attachment means for attaching two van sections together.

26. A system for transporting goods as defined in claim 25 wherein the attachment means comprises means positioned adjacent the two upper corners of each compartment for attaching two compartments together.

27. A system for transporting goods as defined in claim 25 further comprises means positioned adjacent a lower edge of each compartment for attaching two compartments together.

28. A system for transporting goods as defined in claim 19 wherein the means for positioning the compartments on the trailer frame comprises a pyramidal-shaped elongated structure oriented longitudinally on the trailer frame and at least one complementary shaped recess provided on the bottom of the compartment.

29. A system for transporting goods as defined in claim 19 wherein each of the plurality of compartments includes a metallic frame having a member positioned on the interior of each edge of the compartment, the frame members being configured such that four frame members of a compartment interengage four frame members of a compartment when the first and second compartments are attached together to form a continuous van body.

30. A system for transporting goods as defined in claim 19 wherein the plurality of compartments comprises three compartments.

31. A system for transporting goods as defined in claim 19 wherein each of the plurality of compartments is s substantially configured in a cubic shape.

32. A system for transporting goods as defined in claim 19 wherein each of the plurality of compartments is substantially rectangularly shaped.

33. A system for transporting goods as defined in claim 19 further comprising hoisting means for individually moving the compartments between a position secured to the trailer frame and a position separated from the trailer frame, the hoisting means comprising:
   at least one mast having a support bracket capable of vertical travel;
   means for moving the mast between an operating position adjacent the rear end of the tractor and a transporting position;
   movement means connected to the mast for selectively generating upward and downward movement of the support bracket; and
   lifting means, capable of engaging the compartment and connecting to the support bracket, the lifting means for supporting the compartment as it is moved between the trailer frame and another location.

34. A system for transporting goods as defined in claim 19 wherein all of the plurality of compartments are identical and are interchangeable in different positions on the same trailer frame and a plurality of additional trailer frames.

35. A system for transporting goods as defined in claim 19 wherein the trailer frame comprises an extensible trailer frame.

* * * * *